(12) United States Patent
Amerga et al.

(10) Patent No.: US 8,843,115 B2
(45) Date of Patent: Sep. 23, 2014

(54) METHOD AND APPARATUS FOR MANAGING SYSTEM INFORMATION MODIFICATION IN A WIRELESS COMMUNICATION SYSTEM

(75) Inventors: Daniel Amerga, San Diego, CA (US); Nathan Edward Tenny, Poway, CA (US); Vivek V. Ramachandran, Redmond, WA (US)

(73) Assignee: QUALCOMM Incorporated, San Diego, CA (US)

( * ) Notice: Subject to any disclaimer, the term of this patent is extended or adjusted under 35 U.S.C. 154(b) by 728 days.

(21) Appl. No.: 12/487,499

(22) Filed: Jun. 18, 2009

(65) Prior Publication Data

US 2009/0316603 A1 Dec. 24, 2009

Related U.S. Application Data

(60) Provisional application No. 61/074,817, filed on Jun. 23, 2008.

(51) Int. Cl.
*H04L 12/58* (2006.01)
*H04W 48/08* (2009.01)
*H04W 8/20* (2009.01)

(52) U.S. Cl.
CPC .............. *H04W 48/08* (2013.01); *H04W 8/205* (2013.01)
USPC ..... 455/412.1; 455/458; 455/466; 455/414.1; 455/434; 370/310; 370/312; 370/319; 370/328; 370/342; 370/347

(58) Field of Classification Search
None
See application file for complete search history.

(56) References Cited

U.S. PATENT DOCUMENTS

| 7,079,840 | B2 * | 7/2006 | Roberts et al. | 455/434 |
| 8,155,596 | B2 * | 4/2012 | Eckert et al. | 455/67.11 |
| 8,185,726 | B2 * | 5/2012 | Taha et al. | 713/1 |
| 2007/0133456 | A1 * | 6/2007 | Ding | 370/328 |

OTHER PUBLICATIONS

International Search Report and Written Opinion—PCT/US2009/048289, International Search Authority—European Patent Office—Nov. 6, 2009.
Qualcomm Europe: "Various issues at system-information update" 3GPP Draft; R2-083263, 3rd Generation Partnership Project (3GPP), Mobile Competence Centre; 650, Route Des Lucioles: F-06921 Sophia-Antipolis Cedex ; France, vol, RAN WG2, No. Warsaw, Poland; Jun. 24, 2008, XP050140683.

(Continued)

*Primary Examiner* — Willie J Daniel, Jr.
(74) *Attorney, Agent, or Firm* — Anthony R. Morris

(57) ABSTRACT

Systems and methodologies are described that facilitate improved management of a system information modification in a wireless communication environment. Various techniques can be utilized as described herein to provide respective users with information indicative of changes to specific blocks or elements within a set of system information, thereby simplifying and accelerating acquisition of new system information after a modification. In a first example, a bitmap is generated and transmitted upon a system information modification that indicates which blocks(s) and/or element(s) of the system information changed in the modification, thereby allowing an associated user to abstain from reading or processing unchanged system information. In a second example, respective block(s) and/or element(s) of the system information can include an internal value tag that indicates to a receiving entity whether the corresponding block(s) or element(s) have changed, thereby allowing a user to discard unchanged block(s) or element(s) without performing further processing.

26 Claims, 17 Drawing Sheets

(56) References Cited

OTHER PUBLICATIONS

Qualcomm Europe: "Granularity of information at SIB modification" 3GPP Draft: R2-085587, 3rd Generation Partnership Project (3GPP), Mobile Competence Centre; 650, Route Des Lucioles; F-06921 Sophia-Antipolis Cedex ; France; No. Prague, Czech Republic; Sep. 23, 2008, XP050320391.

Texas Instruments Inc "System-Information Change notification procedure", 3GPP Draft; R2082491_SI_change_notification, Apr. 28, 2008 3rd Generation Partnership Project (3GPP), Mobile Competence Centre ; 650, route des Lucioles ; F-06921 Sophia-Antipolis Cedex ; France ; vol. RAN WG2,Nr:Kansas City, USA; Apr. 28, 2008, XP050140457.

Universal Mobile Telecommunications System (UMTS); Radio Resource Control (RRC); Protocol Specification (3GPP TS 25.331 version 7.7.0 Release 7); ETSI TS 125 331.

ETSI Standards, Lis Sophia Antipolis Cedex, France, vol. 3-R2, No. v7.7.0, Jan. 1, 2008 XP014040640, paragraphs[8.1.1.1; 8.1.1.7; 8.7.1; 8.7.3].

Taiwan Search Report—TW098121027—TIPO—Dec. 19, 2012.

* cited by examiner

METHOD AND APPARATUS FOR MANAGING SYSTEM INFORMATION MODIFICATION IN A WIRELESS COMMUNICATION SYSTEM

CROSS-REFERENCE

This application claims the benefit of U.S. Provisional Application Ser. No. 61/074,817, filed Jun. 23, 2008, and entitled "OPTIMISATION FOR SYSTEM INFORMATION MODIFICATION AND VALUE-TAG MANAGEMENT IN LTE," the entirety of which is incorporated herein by reference.

BACKGROUND

I. Field

The present disclosure relates generally to wireless communications, and more specifically to techniques for managing modification of information associated with a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

In some conventional wireless communication implementations, a wireless communication network can engage in communication with a set of user equipment units (UEs) according to a set of system parameters or system information associated with the network. This system information can be transmitted by the network as a series of information blocks and/or other units at regular intervals such that UEs communicating with the network can efficiently obtain the system information.

In the event that modification of system information is desired, the network can undergo a system information modification procedure by which all UEs communicating with the network are informed of an impending change to the system information. However, in conventional implementations, a wireless communication network conveys only a generalized indicator of an upcoming change of system information to its respective served UEs without providing any further information relating to the information to be changed. As a result, UEs communicating with the network can in some cases be required to re-acquire all system information at each modification regardless of the information to be affected by a given modification. Such a requirement can, in turn, cause losses in UE and/or network performance and power efficiency, an increase in UE implementation complexity, and/or other negative effects on respective UEs and/or an associated network. Accordingly, it would be desirable to implement techniques for managing a modification of system information associated with a wireless communication network that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a set of system information associated with a wireless communication environment, the system information comprising one or more blocks; receiving respective indicators relating to a modification of the system information in one or more of a block of the system information or a paging message, wherein the indicators identify one or more blocks or groups of blocks that have changed in the modification; and performing at least one of reading or processing respective blocks in a selective manner such that the reading or processing is omitted for at least one block identified as unchanged in the modification.

A second aspect relates to a wireless communications apparatus, which can comprise a memory that stores data relating to system information corresponding to an associated wireless communication network, the system information comprising one or more blocks. The wireless communications apparatus can further include a processor configured to identify modification information in one or more blocks or a paging message associated with the one or more blocks that is indicative of one or more blocks that have been updated and to selectively read or process respective blocks such that no reading or processing is performed for at least one block not identified as updated by the modification information.

A third aspect described herein relates to an apparatus operable in a wireless communication system. The apparatus can comprise means for storing a set of system information blocks; means for detecting information relating to a subsequent set of information blocks; and means for receiving one or more indicators in the subsequent set of information blocks or a paging message provided in the detected information, wherein the one or more indicators specify respective information blocks that have been updated from respective stored versions of the information blocks; and means for selectively receiving or processing at least one updated information block based on the received indicators.

A fourth aspect described herein relates to a computer program product, which can comprise a computer-readable medium that includes code for causing a computer to identify system information associated with a serving wireless communication network, the system information comprising one or more information blocks; code for causing a computer to detect information relating to one or more subsequent information blocks; code for causing a computer to receive respective indicators in one or more subsequent information blocks or a paging message associated with the one or more subsequent information blocks that identify respective information blocks that have been updated in a system information modification; and code for causing a computer to read or process subsequent information blocks in a selective manner such that no reading or processing is performed for at least one subsequent information block not identified as updated by the respective received indicators.

According to a fifth aspect, a method that can be utilized in a wireless communication environment is described herein. The method can comprise identifying a set of blocks configured to carry system information; identifying one or more blocks to be changed during a system information modification; generating a set of indicators that convey information relating to the blocks to be changed during the system information modification; and transmitting the set of indicators within one or more blocks or a paging message associated with the system information modification.

A sixth aspect relates to a wireless communications apparatus, which can comprise a memory that stores data relating to a set of information blocks and a system information update. The wireless communications apparatus can further include a processor configured to identify at least one information block to be changed during the system information update, to generate signaling indicative of the at least one information block to be changed during the system information update, and to communicate the generated signaling within one or more information blocks during the system information update or within a paging message prior to the system information update.

A seventh aspect described herein relates to an apparatus operable in a wireless communication system. The apparatus can comprise means for configuring a set of system information comprising respective information elements; means for updating system information corresponding to at least one information element; and means for generating information that indicates respective information elements that include updated system information; and means for transmitting the generated information within one or more information elements or a paging message associated with the one or more information elements.

An eighth aspect described herein relates to a computer program product, which can include a computer-readable medium that comprises code for causing a computer to configure a set of blocks to carry system information; code for causing a computer to initiate modification of at least one block in the set of blocks; code for causing a computer to generate one or more indicators of the at least one block for which modification is initiated; and code for causing a computer to transmit respective generated indicators within one or more blocks in the set of blocks or a paging message associated with the set of blocks To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
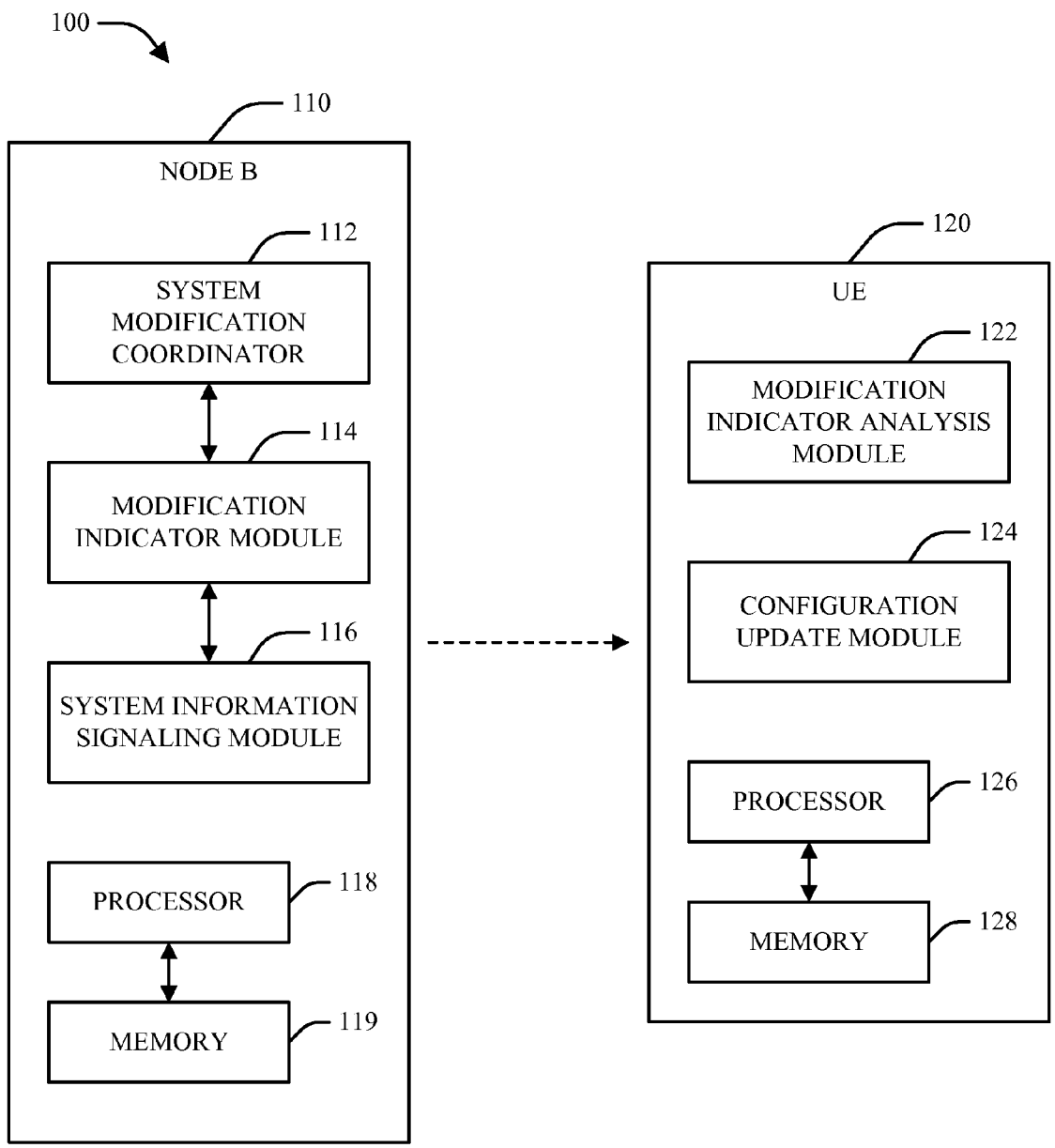
FIG. 1 is a block diagram of a system that facilitates optimized management of a system information modification and/or related value tags in a wireless communication environment in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 that facilitates optimized management of a system information modification and/or related value tags in a wireless communication environment in accordance with various aspects described herein. As FIG. 1 illustrates, system 100 can include a Node B 110 (also referred to herein as a base station, access point (AP), Evolved Node B (eNB), etc.), which can communicate with one or more user equipment units (UEs, also referred to herein as access terminals (ATs), mobile terminals, etc.) 120. In one example, Node B 110 can engage in one or more downlink (DL, also referred to as forward link (FL)) communications with ULE 120, and UE 120 can engage in one or more uplink (UL, also referred to as reverse link (RL)) communications with Node B 110. In another example, Node B 110 can be associated with a wireless communication network, such as an Evolved UMTS (Universal Mobile Telecommunications System) Terrestrial Radio Access Network (E-UTRAN), or a portion thereof (e.g., cell, sector, etc.). Further, Node B 110 can operate in conjunction with one or more other network entities, such as a system controller (not shown) or the like, for coordinating communication between Node B 110 and UE 120.

In accordance with one aspect, Node B 110 and/or a wireless communication network associated with Node B 110 can utilize a set of system information, which can include one or more general parameters of Node B 110 that are common for all UEs 120 served by Node B 110. Examples of such system information can include generalized radio link configuration parameters, network policies (e.g., supported RATs, bandwidth information, etc.), default parameters associated with the network, or the like. In one example, system information can be signalled by Node B 110 to respective served UEs 120 using a system information signalling module 116 and/or another suitable component of Node B 110 according to a predefined transmission structure at regular predefined intervals.

By way of specific example, a structure utilized for transmission of system information can include one or more blocks, such as a Master Information Block (MIB) and/or a set of System Information Blocks (SIBs). In one example, a MIB can be configured utilizing a fixed low-layer format and modulation scheme such that a UE receiving the MIB can read the MIB with minimal required post-processing in order to bootstrap the system acquisition process. Further, in another example, respective MIBs and/or SIBs can be configured to correspond to one or more system information (SI) messages. Thus, a MIB can correspond to a first SI message, a first group of SIBs can correspond to a second SI message, a second group of SIBs can correspond to a third SI message, and so on. In a further specific example, system information can be signalled within a predefined number of blocks, such as 1 MIB and 11 SIBs. It should be appreciated, however, that any number of MIBs and/or SIBs could be utilized, including those greater or less than 1 MIB and 11 SIBs. It should further be appreciated that, unless explicitly stated otherwise, the hereto appended claims are not intended to be limited to any specific system information signalling structure.

In accordance with another aspect, in the event that a change to some or all of the system information associated with Node B 110 is desired, a system modification coordinator 112 and/or any other suitable component of Node B 110 can be utilized to facilitate the appropriate change(s) to the system information. For example, system modification coordinator 112 can, either independently or with the aid of a modification indicator module 114, generate an indication that system information associated with Node B 110 is to be modified. System information signalling module 116 and/or another suitable component of Node B 110 can subsequently be utilized to signal an indication of an impending modification to respective UEs 120 at a given modification period and/or other interval in time. Following transmission of an indication of an upcoming change to system information, Node B 110 can facilitate modification of the system information at a following modification period and/or other time interval.

At UE 120, upon receiving a transmission from Node B 110, a modification indicator analysis module 122 and/or another suitable component of UE 120 can be utilized to determine whether the transmission includes an indication that system information is to be modified. If such an indication is found to be present, a configuration update module 124 and/or another component of UE 120 can be utilized to receive updated system information at a predetermined time following receipt of the indication and to update the configuration of UE 120 in view of the updated information.

In accordance with an additional aspect, when the system information transmitted by a conventional wireless communication network changes, such a conventional network can be configured only to provide a general indicator that a change to system information is to occur. For example, a network can be configured only to advance a single value tag (e.g., carried in SIB1) without an indication of which individual elements of the system information (e.g., as provided in respective SIBS) are to be modified. As a result, respective UEs communicating with the network are required to re-acquire all relevant system information (e.g., all system information required for the current Radio Resource Control (RRC) state of the UE), for all changes to system information irrespective of the system information actually affected by the modification. In the worst case, it can be appreciated that if a modification affects only a Master Information Block (MIB) and/or a relatively small number of other units of system information that are transmitted frequently and readily acquirable by a UE, the UE would be required to read the entirety of the system information, including all SIBs and/or other units in which the system information is provided, only for the UE to discover that such information has not changed.

Thus, by requiring UEs to re-acquire all system information at each modification regardless of the information to be affected by a given modification in this manner, respective UEs acquiring modified system information can experience a loss of power efficiency, bandwidth efficiency, and/or other performance losses. Further, it can be appreciated that, using a conventional implementation as described above, a change to any SIB and/or any other system information can force respective UEs to explore all fields of all SIBs in the course of determining whether there was a change to any given SIB, as no internal indication is provided in any SIB relating to whether its contents have changed. Accordingly, in addition to the performance issues described above, such a requirement can additionally impose an implementation burden on UE design.

In accordance with one aspect, in order to mitigate at least the above shortcomings, Node B 110 can utilize one or more improved air-interface approaches as described herein to simplify and accelerate acquisition of new system information at respective UEs 120 following modification of one or more SIBs and/or other units corresponding to the new system information. In one example, these and/or other related ends can be accomplished at Node B 110 by configuring modification indicator module 114 to provide, in connection with a change to system information, indicators relating to specific elements (e.g., blocks) of system information to be changed. These indicators can then be transmitted by system information signalling module 116 within the system information itself, within a paging message provided to indicate an update to the system information, and/or in any other suitable manner. Upon subsequent receipt, UE 120 can utilize modification indicator analysis module 122 and/or any other appropriate associated components to determine from the provided indicators which system information is to be changed. Based on this determination, configuration update module 124 can be configured to selectively receive and/or process only the elements of the system information that are to be modified.

In accordance with another aspect, information relating to which information is to be updated during a system information modification can be provided in a variety of manners. In a first example described herein, a bitmap can be utilized to identify respective system information elements that are to be updated during a system information modification. In a second example described herein, respective blocks or elements of system information can be configured to include internal value tags that identify whether or not the contents of the respective blocks have changed. These examples are described in further detail infra. However, it should be appreciated that the above examples are not intended to be provided by way of limitation and that, unless explicitly stated otherwise, the claims are not intended to be limited to the above examples or any other specific technique(s) described herein.

In accordance with a further aspect, Node B 110 can include and/or otherwise be associated with a processor 118 and/or memory 119, which can be utilized to implement some or all of the functionality of system modification coordinator 112, modification indicator module 114, system information signalling module 116, and/or any other aspects of Node B 110 described herein. Similarly, UE 120 can include a processor 126 and/or memory 128 that can be utilized to implement some or all functionality of modification indicator analysis module 122 or configuration update module 124 and/or any other suitable functionality of UE 120.

Figure 2:
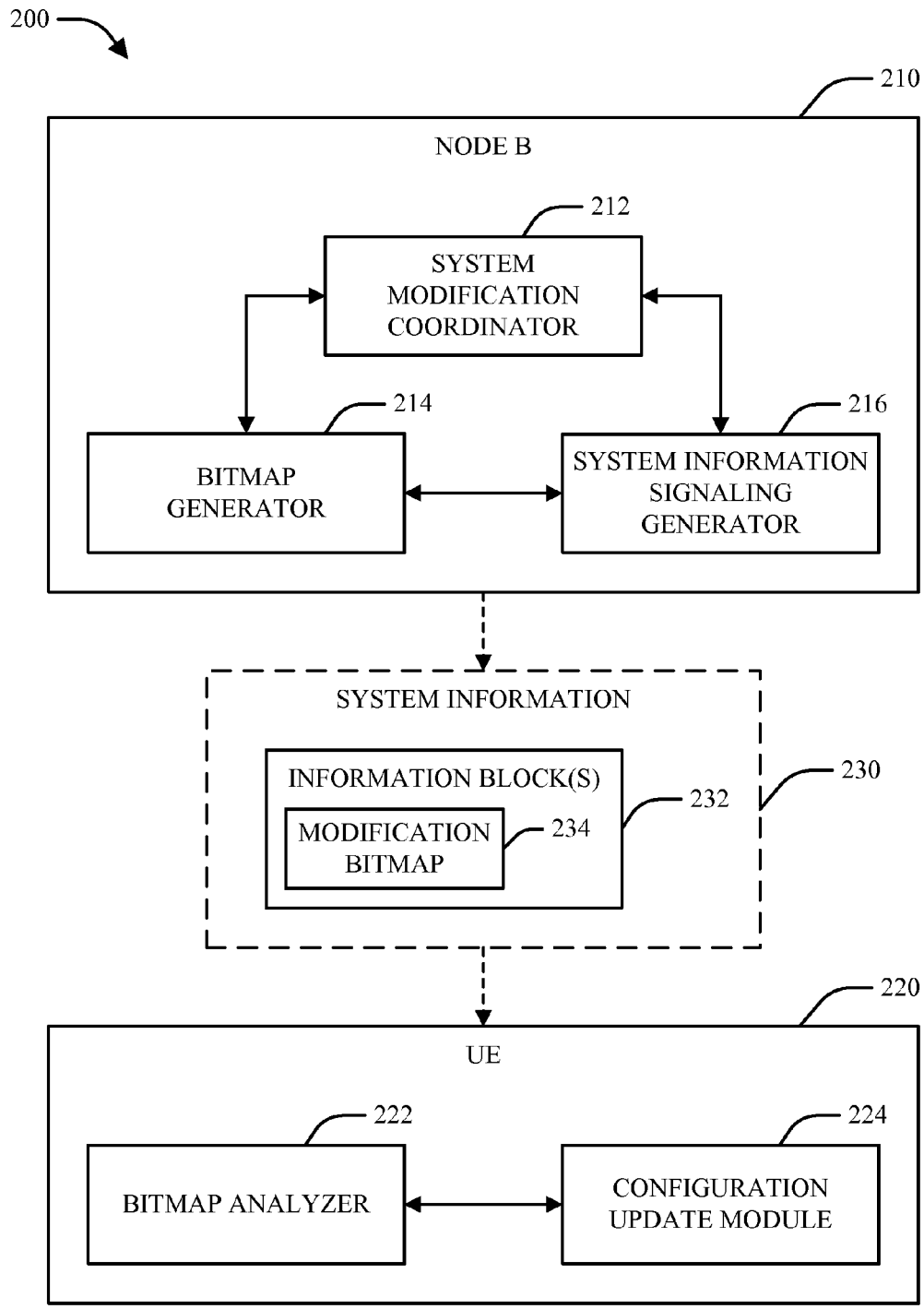
FIG. 2 is a block diagram of a system for generating and processing a bitmap corresponding to respective modifications of system information in accordance with various aspects.

Referring next to FIG. 2, a block diagram is provided that illustrates a system 200 for generating and processing a bitmap 234 corresponding to respective modifications of system information in accordance with various aspects. As FIG. 2 illustrates, system 200 can include a Node B 210, which can communicate with a UE 220 in the manner generally described above with respect to system 100 and/or in any other suitable manner. As further illustrated in system 200, Node B 210 can transmit system information 230 to UE 220 via a system information signaling generator 216 and/or any other suitable component(s). In one example, system information 230 can be composed of respective information block(s) 232, which can include, for example, a MIB and/or one or more SIBs as generally described above.

In accordance with one aspect, in the event that system information 230 is to be modified, a system modification coordinator 212 can manage the relevant updates to the system information as well as the generation of indicator(s) relating to the updates. In one example, when system information 230 is modified, system modification coordinator 212 can further indicate which specific information block(s) 232 have changed by providing a modification bitmap 234 in connection with the system information 230. In another example, bitmap 234 can be generated by a bitmap generator 214 and/or any other suitable entity and can be signaled by system information signaling generator 216 to UE 220.

System information 230 can be configured such that bitmap 234 is included in an early-arriving information block 232 (e.g., SIB 1). Additionally or alternatively, bitmap 234 can be transmitted in a paging message that indicates an upcoming system information modification (e.g., on a Paging Control Channel (PCCH) and/or another suitable communication channel), and/or by any other suitable means.

In accordance with a further aspect, UE 220 can analyze received system information 230 and/or information associated therewith (e.g., related paging messages) to determine whether changes to system information 230 have occurred. Upon detecting that a system information modification has occurred, UE 220 can utilize a bitmap analyzer 222 and/or any other suitable component(s) to process a bitmap 234 provided within received system information 230 to determine which information block(s) 232 within system information 230 have changed. Finally, UE 220 can utilize a configuration update module 224 to read and/or process the modified information block(s) 232. With regard to the operation of UE 220, it can be appreciated that, by providing bitmap 234 within an early-arriving information block 232 and/or within a paging message that precedes system information 230, UE 220 can be made aware of specific information block(s) 232 that are to be modified prior to receiving some or all of said information block(s) 232. As a result, ULE 220 can be enabled to avoid excessive bandwidth consumption, power usage, computational complexity, or the like associated with reading and/or processing portions of system information 230 that remain unchanged.

Figure 3:
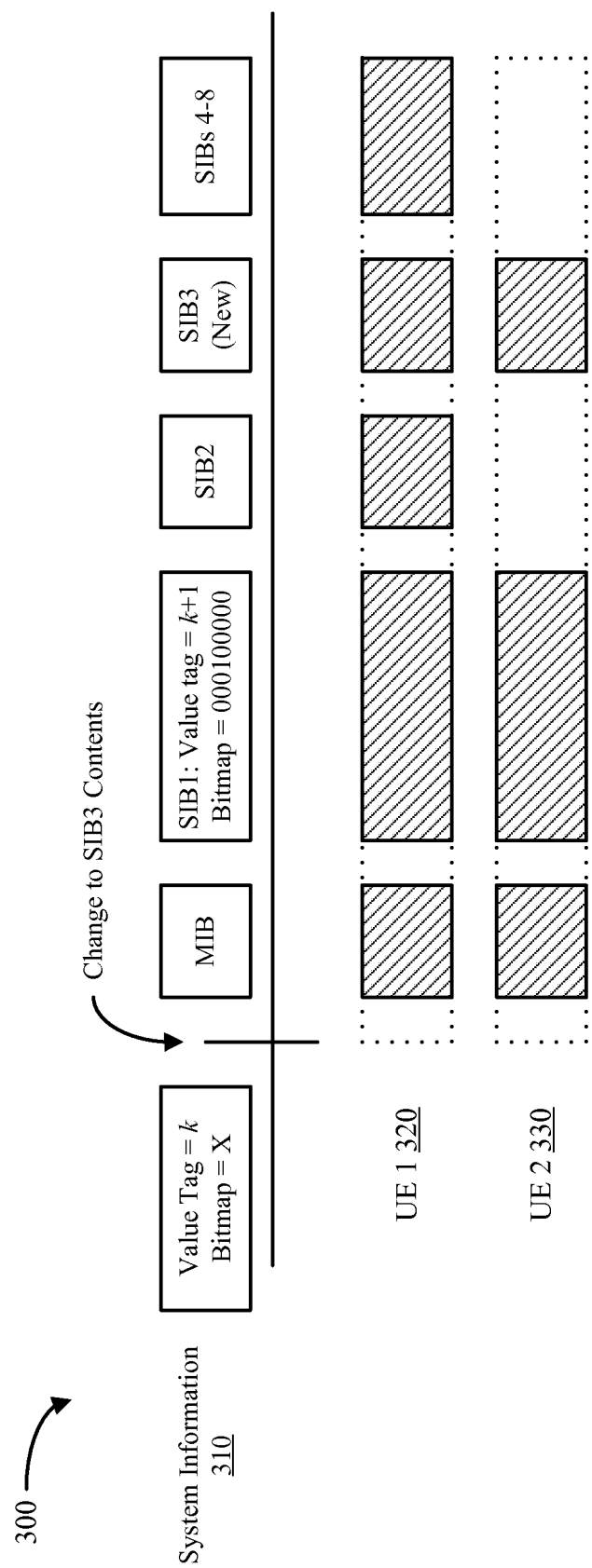
FIG. 3 illustrates example processing of a bitmap provided in association with a change of one or more system parameters in accordance with various aspects.

An example message flow illustrating how a bitmap 234 can be generated and utilized is illustrated by diagram 300 in FIG. 3. In the example illustrated by diagram 300, a set of system information 310 that includes a MIB and eight SIBs (SIBs 1-8) is utilized. It should be appreciated, however, that system information 310 could alternatively be structured in any other suitable manner. As further illustrated by diagram 300, a bitmap is provided in an early-arriving SIB (e.g., SIB 1) that contains one bit for each SIB defined in the system wherein bit n in the bitmap is set to 1 if SIBn was changed in the most recent modification or to 0 otherwise. As nine SIBs (e.g., a MIB and SIBs 1-8) are provided in the example shown in diagram 300, a bitmap provided within system information 310 can contain nine bits that correspond to the respective SIBs.

In one example, a modification can occur for one or more SIBs in system information 310 at a given modification period and/or another suitable interval in time. Upon occurrence of the modification, a bitmap provided within system information 310 can be configured to indicate the specific SIBs that are altered in the modification. Thus, in the example illustrated by diagram 300, the bitmap can be set to a value of "000100000" in order to indicate that SIB3 has changed and all other SIBs have not changed. The configured bitmap can subsequently be transmitted to respective UEs, which can utilize the bitmap to enhance performance associated with the modification. For example, as the change illustrated in diagram 300 affects only SIB3, a first UE 320 not using the bitmap is required to read all nine SIBs due to the possibility that any of them could have changed, while a second UE 330 that utilizes the bitmap can rely on the information in the bitmap to declare its system update procedure complete as soon it has received SIB3 without waiting for SIBs 4-8 to be transmitted, thereby electing not to receive unchanged SIBs 2 or 4-8.

While SIBs 4-8 are shown as a single box in diagram 300 for brevity, it can be appreciated that the time required to receive SIBs 4-8 can be significant, particularly in a case where a UE misses receiving one of the SIBs due to Radio Frequency (RF) conditions and/or other factors and is required to wait for another SIB cycle. Thus, by being able to elect not to receive respective SIBs in reliance on a bitmap provided within system information 310, the efficiency of a UE in connection with a change of system information can be significantly increased. In addition, it can be appreciated that UE 330 can realize increased power efficiency as well due to the fact that UE 330 can elect to power off its receiver during the transmission window scheduled for SIBs 2 and 4-8.

With further reference to FIG. 3, it should be appreciated that while diagram 300 illustrates a specific example of a bitmap that can be utilized to indicate changes to system information 310, a bitmap such as that illustrated by diagram 300 can be implemented in various alternative manners. In a first alternative example, indicator bits for respective SIBs up to and including a SIB containing the bitmap can be omitted, as it can be appreciated that a UE receiving system information 310 will be required to read each SIB up to and including a SIB containing the bitmap. Thus, with respect to the specific example shown in diagram 300, a 7-bit bitmap could be utilized that includes respective bits corresponding to SIBs 2-8.

In a second alternative example, a bitmap can be provided that includes bits corresponding to groups of SIBs in addition to and/or in place of individual SIBs. Thus, for example, in the event that a set of SIBs are utilized to form respective SI messages, a bitmap can be provided on a per-SI basis rather than a per-SIB basis. By way of specific, non-limiting illustration, if SIBs 3-5 are conglomerated into a single SI message, a bitmap can be configured to provide one bit corresponding to the SI message corresponding to SIBs 3-5 rather than individual bits for each of SIBs 3-5.

In a third alternative example, bits included in a provided bitmap can be based on respective classifications or characteristics of respective SIBs rather than the SIBs themselves. By way of specific example, a 2-bit bitmap could be utilized in addition to and/or in place of the bitmap illustrated by diagram 300, where a first bit in the bitmap indicates whether a change has occurred to one or more SIBs that affect UEs operating in connected mode (e.g., MIB, SIB 1, SIB2, SIB3, and/or SIB8) and a second bit in the bitmap indicates whether a change has occurred to one or more SIBs that affect UEs operating in idle mode only. By configuring a bitmap in this manner, it can be appreciated that an idle mode UE can elect to receive and process only the section(s) of SIBs that are indicated in the bitmap, while a connected mode UE can disregard the second bit of the bitmap and receive and/or process only the first section of SIBs upon indication of a change. As another example, a 1-bit bitmap can be utilized that indicates only whether a change has occurred to respective SIBs that affect connected mode UEs (e.g., any SIB other than SIBs 4-7), such that an idle mode UE is configured to always receive and process respective SIBs that do not affect connected mode UEs. Additionally or alternatively, respective bitmap bits can be configured to correspond to respective SIBs that affect potentially differing subsets of connected mode UEs. For example, a first bit can be utilized to indicate modification to SIBs that affect all connected mode UEs (e.g., SIBs 1-3), while a second bit can be utilized to indicate modification to SIBs that affect connected mode UEs that perform inter-Radio Access Technology (RAT) handover (e.g., SIB8). It should be appreciated, however, that any suitable classification(s) could serve as the basis for respective bits provided in a bitmap.

In accordance with another aspect, while a bitmap is illustrated in diagram 300 as provided within SIB 1, it should be appreciated that some or all bitmap information relating to system information 310 can be provided at any suitable location(s) within and/or in association with system information 310. In a first example implementation, at least a portion of relevant bitmap information can be provided within a MIB communicated at the beginning of system information 310. Thus, a reduced bitmap can be provided in MIB in accordance with one or more of the condensed bitmap examples described above. Additionally or alternatively, partial bitmap information can be distributed among MIB and one or more other locations within system information 310.

In a second example implantation, a bitmap and/or portions thereof can be deferred to a later SIB, (e.g., SIB2, SIB3, etc.), such that a UE receiving system information 310 is required to read all SIBs up to an including at least one SIB containing the bitmap. In a third example implementation, a bitmap can be communicated prior to system information 310 within a paging message (e.g., transmitted over PCCH and/or any other suitable channel) that indicates an upcoming change to system information 310. With regard to the above example implementations, it should be appreciated that said implementations are not intended to limit the scope of the subject matter claimed herein and that, unless explicitly stated otherwise, the hereto appended claims are not intended to be limited to any specific implementation(s).

Figure 4:
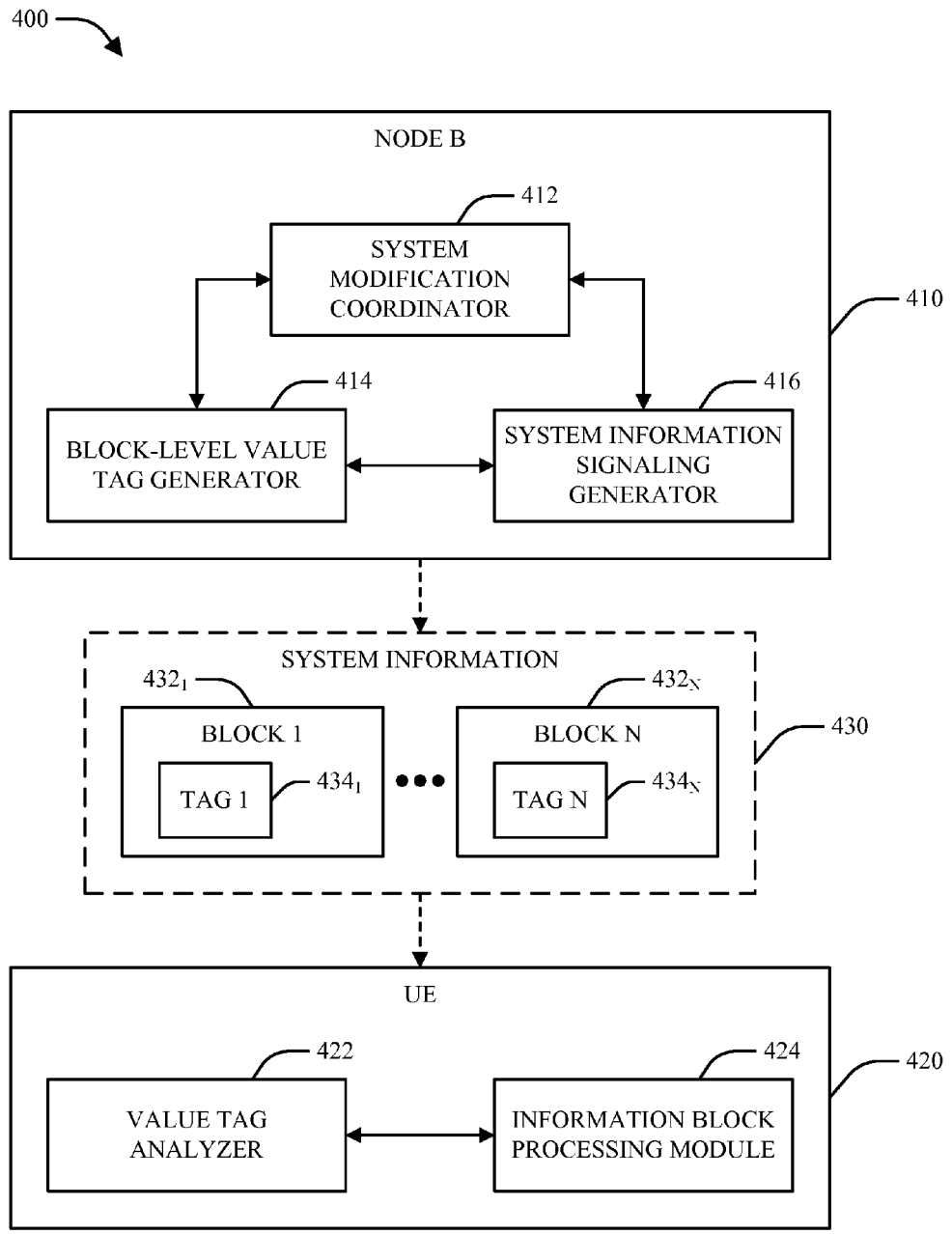
FIG. 4 is a block diagram of a system for generating and processing respective value tags indicative of the current state of respective portions of system information in accordance with various aspects.

With reference next to FIG. 4, a block diagram of a system 400 for generating and processing respective value tags 434 indicative of the current state of respective portions of system information 432 in accordance with various aspects is illustrated. As FIG. 4 illustrates, system 400 can include a Node B 410, which can communicate a set of system information 430 to a UE 420 via a system information signaling generator 416 and/or other suitable means in a similar manner to that described above with regard to system 300. Further, system information 430 can be composed of a set of blocks 432 (e.g., a MIB and a set of SIBs) in a similar manner to system information 330.

In accordance with one aspect, in the event that system information 430 is to be changed, a system modification coordinator 412 can coordinate appropriate modification as generally described above. In one example, Node B 410 can further utilize a block-level value tag generator 414, which can generate tags 434 and/or other information to be provided with respective blocks 432 of system information 430 (e.g., by system information signaling generator 416) that indicate whether the respective blocks 432 have changed.

If no such indication is provided, it can be appreciated that a UE 420 receiving system information 430 can in some cases be required to autonomously determine for each block 432 whether there was a change to the contents of the respective blocks 432 (e.g., by comparing the values of all fields). Alternatively, UE 420 can in some cases be required to behave as if all blocks 432 have changed and overwrite the contents of all stored copies. It can be appreciated that this represents unnecessary work for the implementation of UE 420 in the case that only a small number of blocks 432 have changed, which can in turn result in a loss of efficiency at UE 420. Accordingly, to mitigate this efficiency loss, Node B 410 can be configured to provide internal value tags 434 and/or similar information in respective blocks 432 of system information. Based on value tags 434, a value tag analyzer 422 and/or other suitable components of UE 420 can determine at the time of reception of a particular block 432 whether or not the contents of that block 432 have changed and therefore need to be processed. Based on this analysis, an information block processing module 424 associated with UE 420 can write changed blocks 432 into the internally stored data of the UE 420 and/or silently discard respective blocks 432 determined not to have changed.

Figure 5:
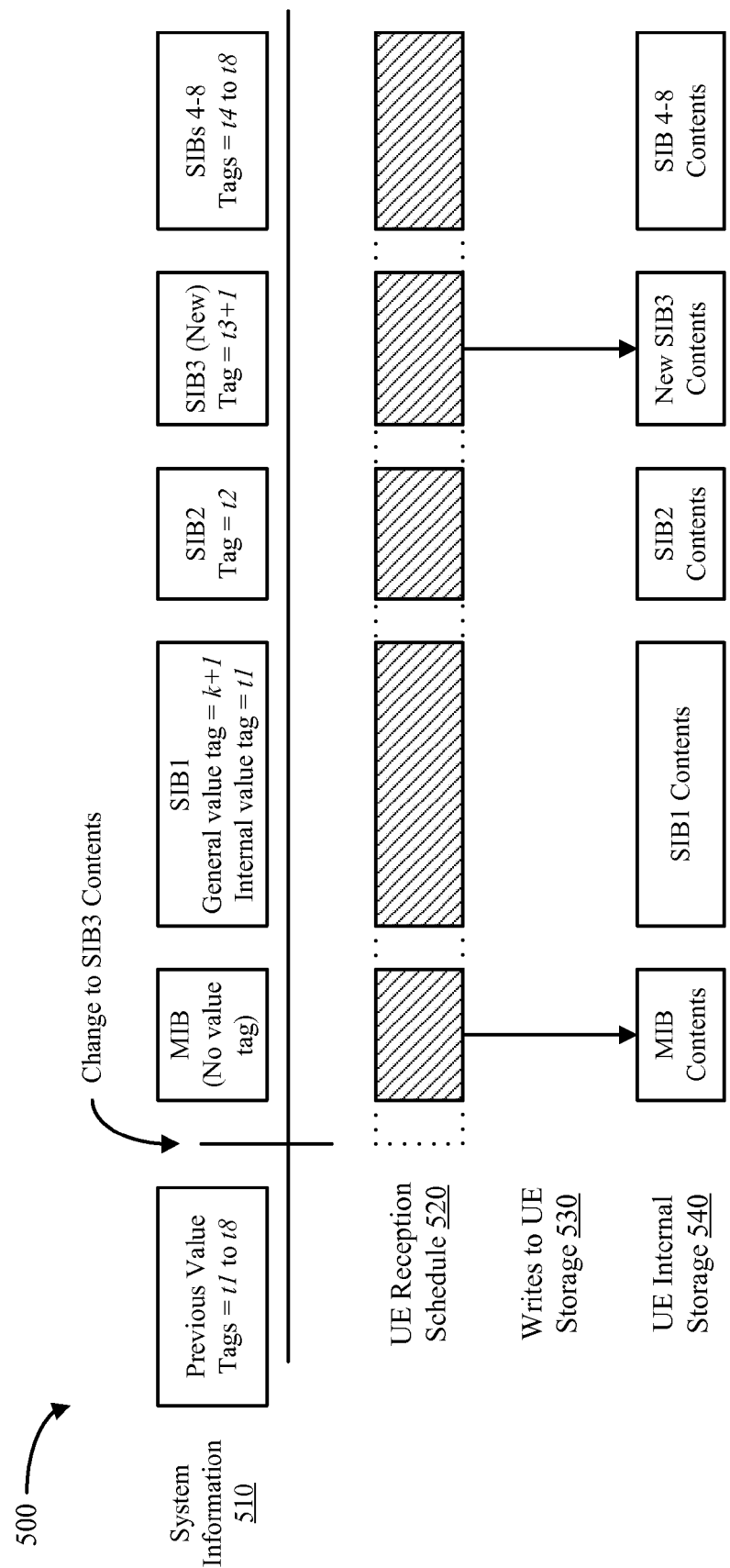
FIG. 5 illustrates example processing of one or more system parameters based on respective internal value tags in accordance with various aspects.

In accordance with one aspect, an example procedure for updating stored system information based on internal value tags is illustrated by diagram 500 in FIG. 5. In a similar manner to the example shown in diagram 300, a set of system information 510 can be utilized that includes nine SIBs (MIB and SIBs 4-8), wherein a modification is made to SIB3. It should be appreciated, however, that any suitable modification to system information 510 could be performed. In one example, SIBs 1-8 can be configured to include respective internal value tags, which prior to modification have the values t1 through t8. While an internal value tag is omitted from the MIB in diagram 500, it should be appreciated that the MIB could additionally or alternatively include an internal value tag. Further, it should be appreciated that internal value tags can be applied to all, some, or no SIBs within system information 510 based on any suitable criteria.

As further shown in diagram 500, SIB1 and/or another suitable element within system information 510 can be configured to carry a general value tag for system information 510, which prior to modification has the value k. In one example, at the time system information 510 is modified, the general value tag can be advanced to k+1, the internal value tag for SIB3 can be advanced to t3+1, and the other tags can be left unchanged. Subsequently, as shown by UE reception schedule 520, a UE can receive respective SIBs corresponding to system information 510, including the MIB (with no value tag), SIB 1 (with the general value tag and its own internal value tag), and/or subsequent SIBs 2-8 (with their corresponding internal value tags). Upon receipt of the respective SIBs, the UE can write the MIB to internal storage, as shown among writes 530. In contrast, it can be observed that since the contents of SIBs 1, 2, and 4-8 have not changed, the UE can infer this information from the respective value tags provided with the SIBs and elect not to store them. Thus, additional storage can be performed solely for SIB3 as illustrated in writes 530, whose value tag has changed from the previous version. Upon completion of writes 530, the internal storage 540 of the UE can include the newly stored MIB and SIB3, along with the previously stored SIBs 1, 2, and 4-8.

In one example illustrated by diagram 500, the internal value tag of SIB1 can be configured such that it is not affected by a change to the general value tag, even in the event that the general value tag is carried in SIB 1. Thus, the general value tag can be regarded as associated with a scheduling block associated with a separate block of data in the same RRC message as SIB 1 rather than with SIB 1 itself. Alternatively, in the event that a UE is configured to store the internal value tag in its internal representation of SIB 1, SIB 1 can in some cases be regarded as changed upon any change to system information 510. Accordingly, an internal value tag for SIB1 can be incremented on any system information modification. Alternatively, a value tag for SIB1 can be omitted with the understanding that the UE is always required to update its stored copy of SIB 1. Similarly, internal value tags can be omitted from one or more other SIBs within system information 510 based on various criteria. For example, an internal value tag can be omitted from a given SIB, such that a UE is required to store the SIB at every system information modification, upon a determination that the utility of enabling the UE to elect not to store the SIB is outweighed by the overhead associated with adding a value tag to the SIB.

Referring now to FIGS. 6-11, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 6:
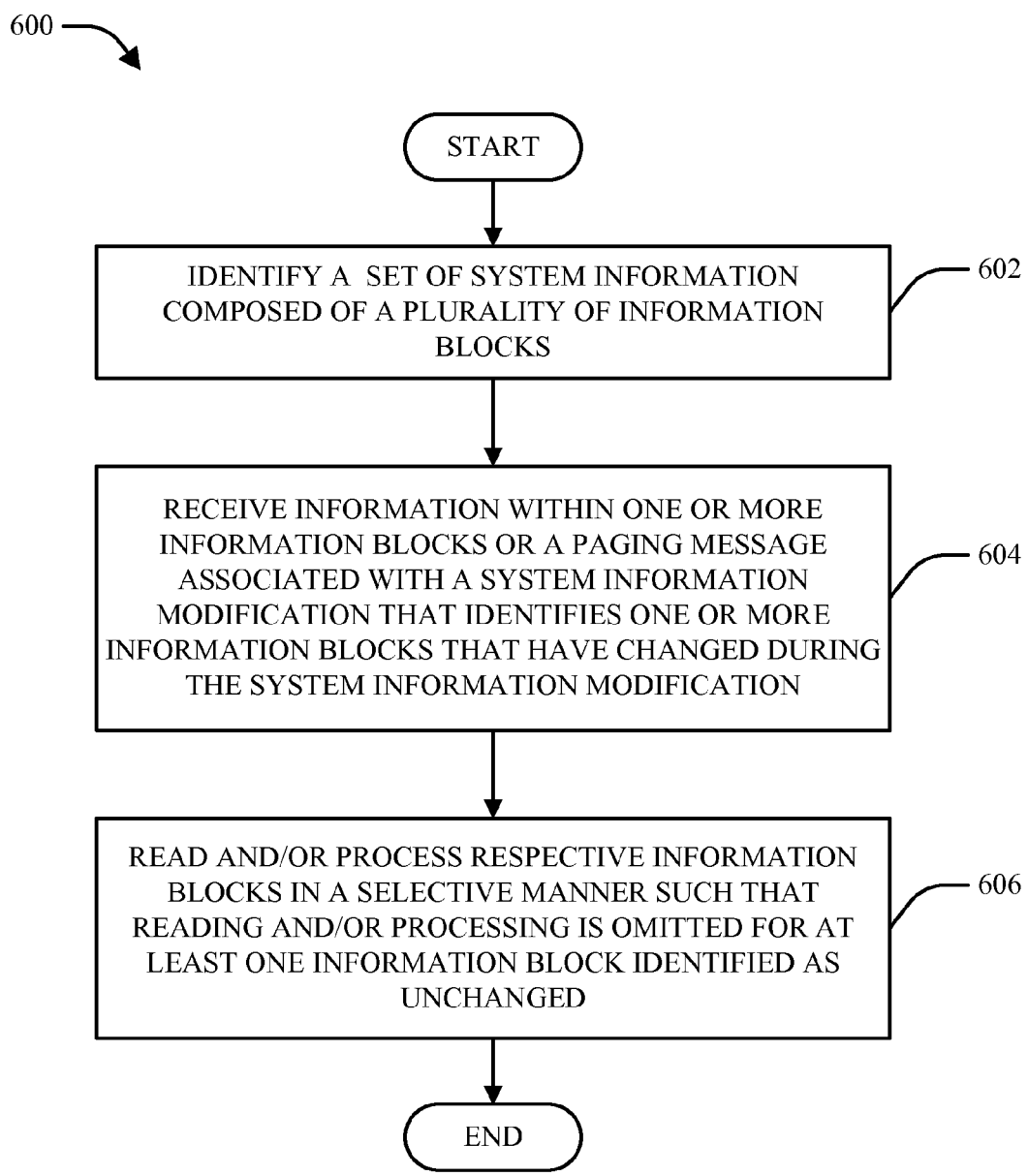
FIGS. 6-8 are flow diagrams of respective methodologies for coordinating reception and processing of information associated with a system information modification in a wireless communication environment.

With reference to FIG. 6, illustrated is a methodology 600 for coordinating reception and processing of information associated with a system information modification in a wireless communication environment. It is to be appreciated that methodology 600 can be performed by, for example, a UE (e.g., UE 120) and/or any other appropriate network device. Methodology 600 begins at block 602, wherein a set of system information composed of a plurality of information blocks (e.g., MIB(s) and/or SIB(s)) is identified. Next, at block 604, information is received (e.g., by modification indicator analysis module 122) within one or more information blocks or a paging message associated with a system information modification that identifies one or more information blocks that have changed during the system information modification (e.g., via a bitmap, value tags, etc.). Finally, at block 606, respective information blocks are read and/or processed in a selective manner (e.g., by configuration update module 124) such that reading and/or processing is omitted for at least one information block identified as unchanged according to the information received at block 604.

Figure 7:
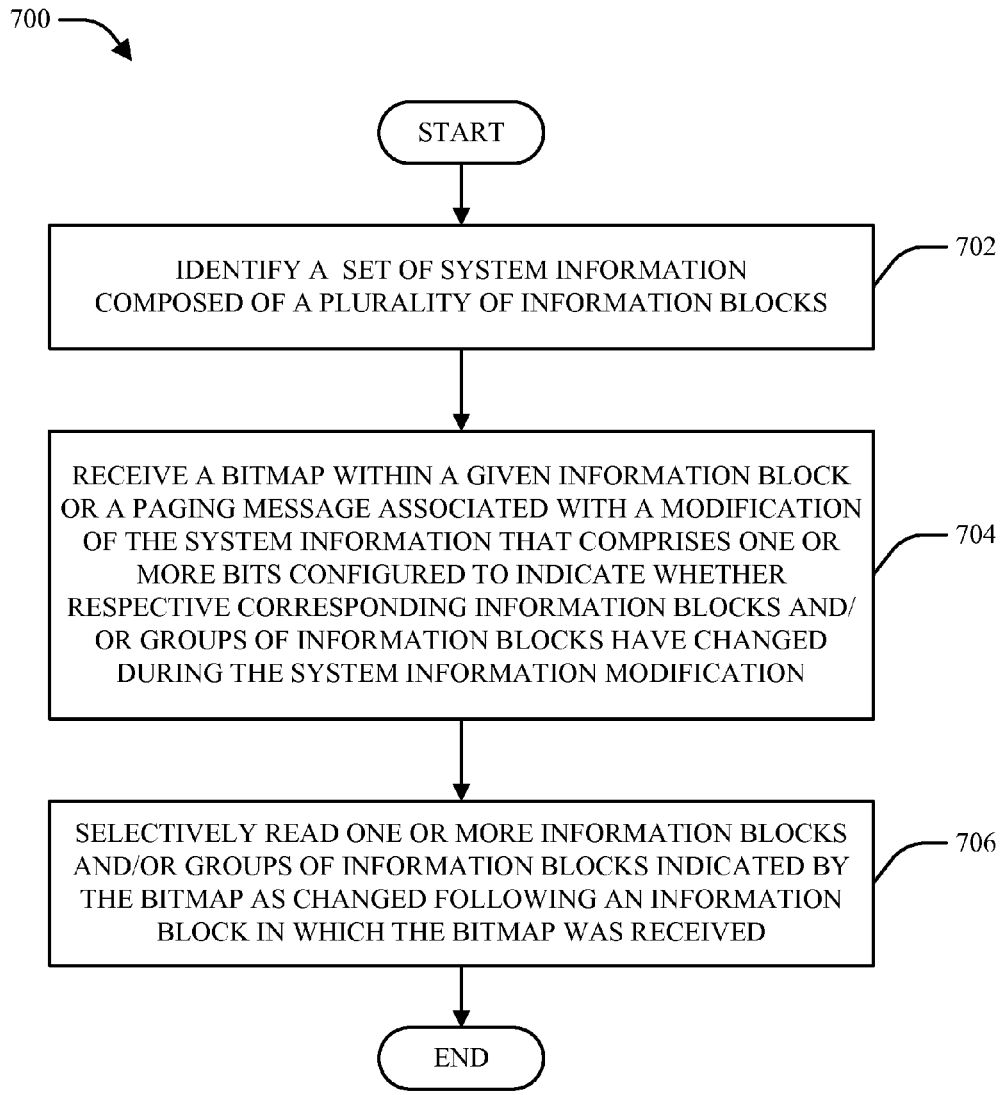

Turning to FIG. 7, a methodology 700 for coordinating reception and processing of modified system information using a bitmap (e.g., bitmap 234) is illustrated. Methodology 700 can be performed by, for example, a mobile terminal and/or any other suitable entity in a wireless communication system. Methodology 700 begins at block 702, wherein a set of system information composed of a plurality of information blocks (e.g., blocks 232) is identified. Next, at block 704, a bitmap is received within a given information block or a paging message associated with a modification of the system information. In one example, the bitmap can comprise one or more bits configured to indicate whether respective corresponding information blocks and/or groups of information blocks (e.g., corresponding to SI messages, idle mode or connected mode users, etc.) have changed during the system information modification. At block 706, methodology 700 can conclude by selectively reading one or more information blocks and/or groups of information blocks (e.g., using configuration update module 224) following an information block in which the bitmap was received at block 704 that are indicated by the bitmap as changed (e.g., as determined by a bitmap analyzer 222).

Figure 8:
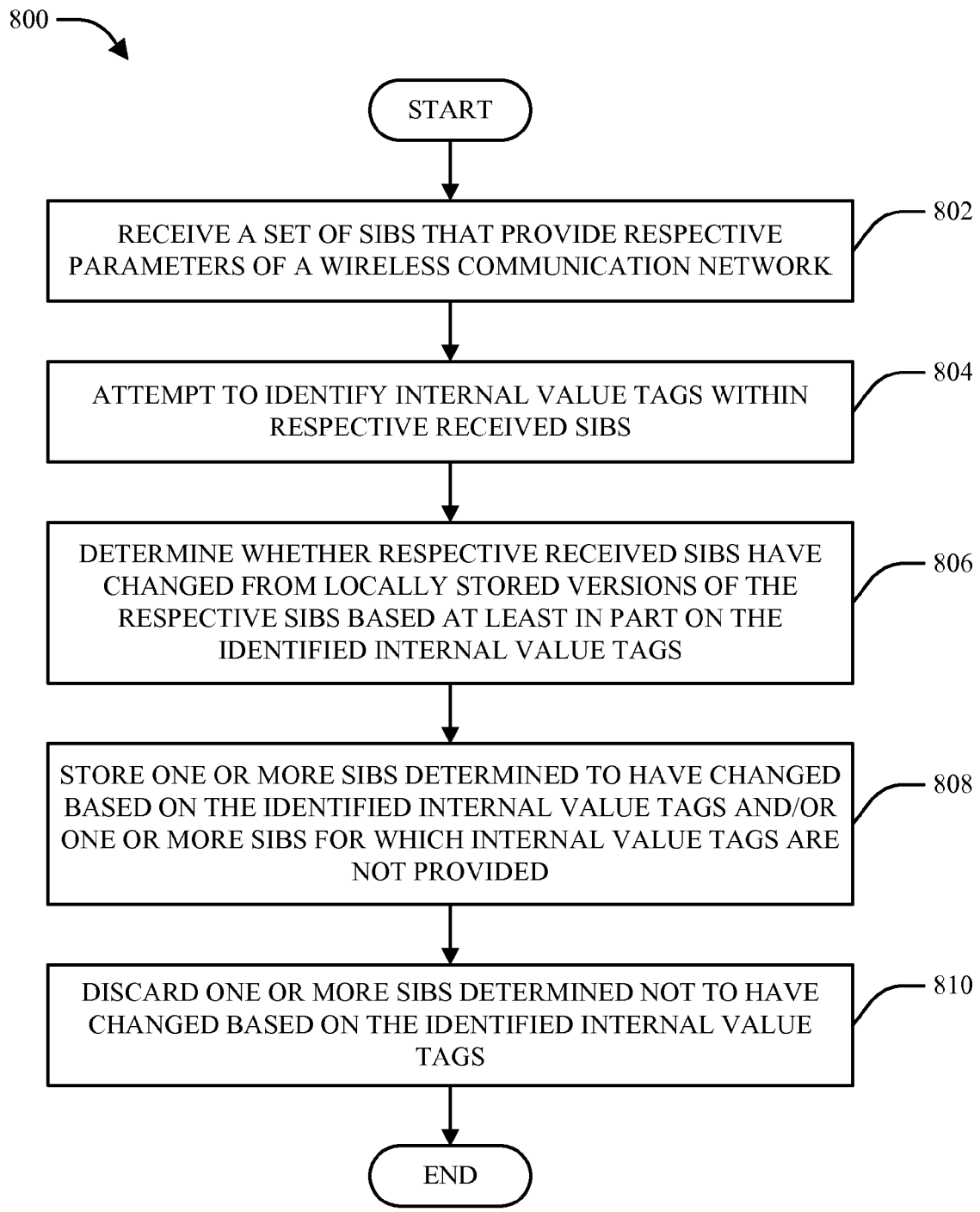

FIG. 8 illustrates a methodology 800 for coordinating reception and processing of modified system information using internal value tags (e.g., tags 434). Methodology 800 can be performed by, for example, a UE and/or any other suitable network device. Methodology 800 begins at block 802, wherein a set of SIBs (e.g., MIB(s) and/or SIB(s) included in blocks 432) are received that provide respective parameters of a wireless communication network. Next, at block 804, an attempt is made to identify internal value tags within respective SIBs received at block 802.

Methodology 800 can then proceed to block 806, wherein it is determined (e.g., using value tag analyzer 422) whether respective SIBs received at block 802 have been changed from corresponding locally stored versions of the SIBs based at least in part on the value tags identified at block 804. Methodology 800 can then conclude by performing the acts described at block 808 and/or 810 (e.g., using information block processing module 424). More particularly, at block 808, one or more SIBs that are determined to have changed based on the internal value tags identified at block 804 and/or for which internal value tags are not provided are stored, and at block 810, one or more SIBs that are determined not to have changed based on the internal value tags identified at block 804 are discarded.

Figure 9:
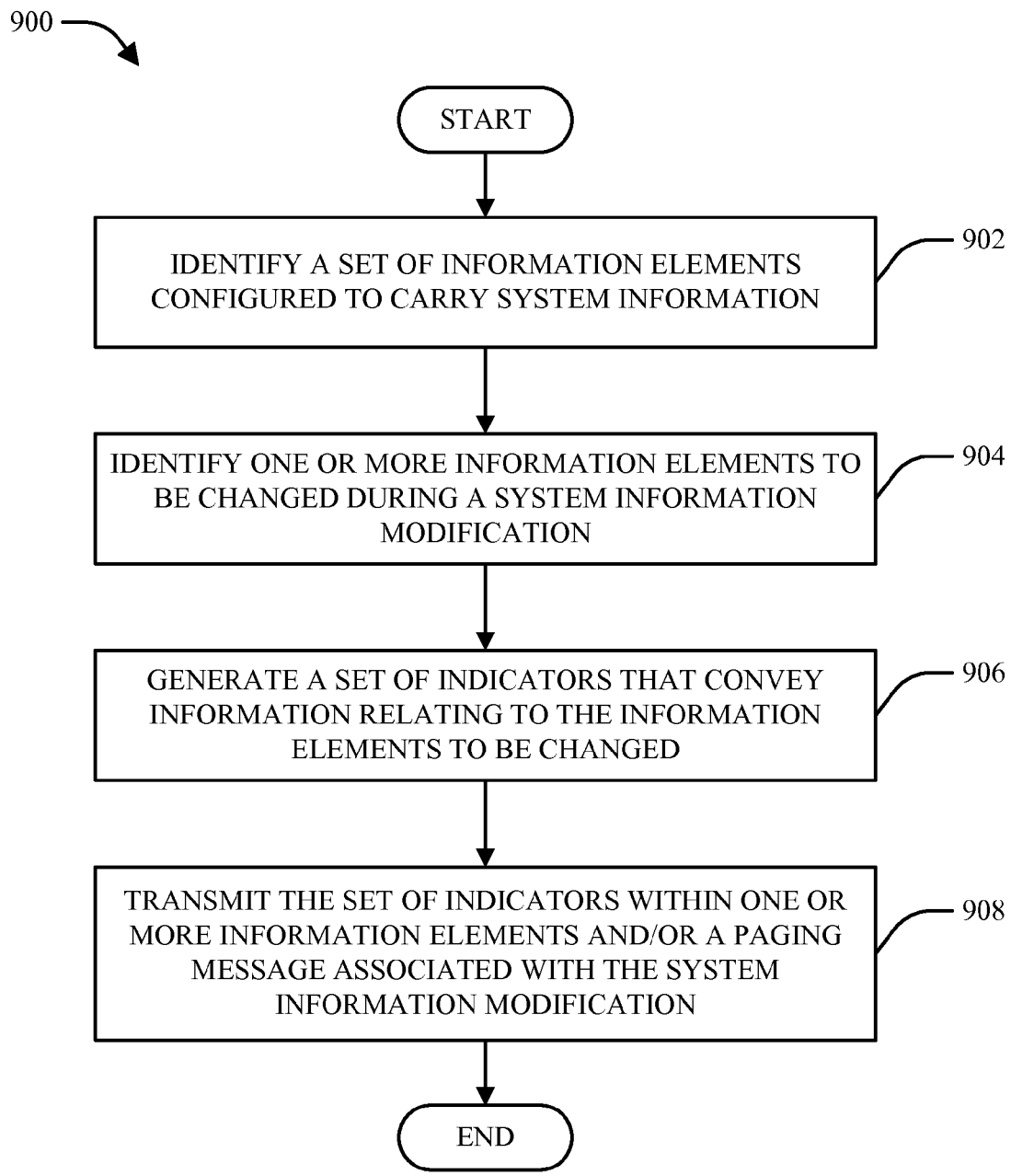
FIGS. 9-11 are flow diagrams of respective methodologies for managing a system information modification in a wireless communication environment.

Referring next to FIG. 9, a methodology 900 for managing a system information modification in a wireless communication environment is illustrated. It is to be appreciated that methodology 900 can be performed by, for example, an access point (e.g., Node B 110) and/or any other appropriate network device. Methodology 900 begins at block 902, wherein a set of information elements configured to carry system information (e.g., MIB(s) and/or SIB(s)) is identified. Next, at block 904, one or more information elements to be changed during a system information modification are identified (e.g., by system modification coordinator 112). Methodology 900 can then proceed to block 906, wherein a set of indicators are generated (e.g., by modification indicator module 114) that convey information relating to the information elements to be changed as identified at block 904. Subsequently, methodology 900 can conclude at block 908, wherein the set of indicators generated at block 906 is transmitted (e.g., by system information signaling module 116) within one or more information elements and/or a paging message associated with the system information modification.

Figure 10:
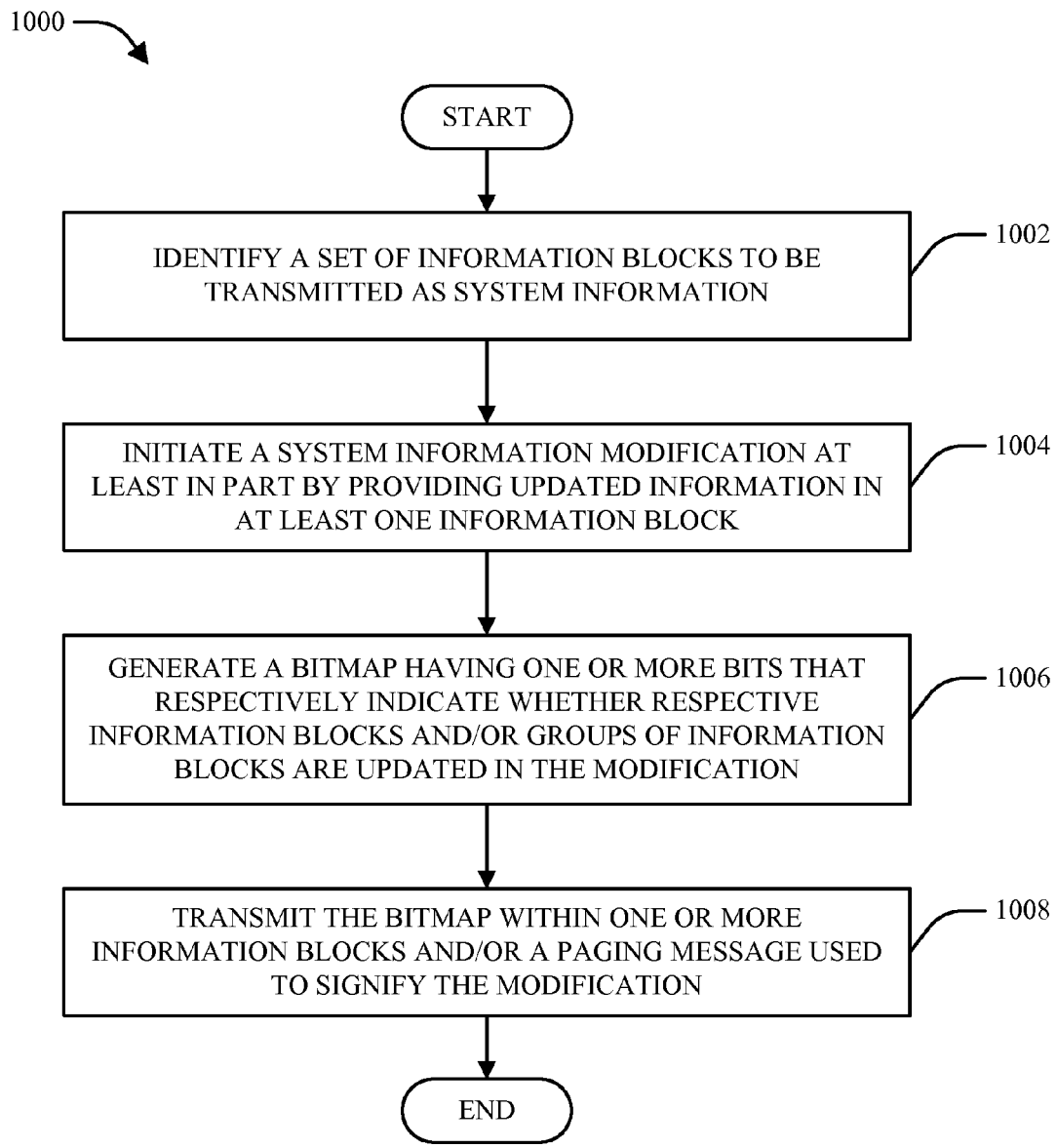

Turning to FIG. 10, a methodology 1000 for managing a system information modification using a bitmap structure (e.g., bitmap 234) is illustrated. Methodology 1000 can be performed by, for example, a Node B and/or any other suitable entity in a wireless communication system. Methodology 1000 begins at block 1002, wherein a set of information blocks (e.g., blocks 232) to be transmitted as system information is identified. Next, at block 1004, a system information modification is initiated (e.g., by system modification coordinator 212) at least in part by providing updated information in at least one information block among those identified at block 1002. At block 1006, a bitmap can be generated (e.g., using bitmap generator 214 and/or system information signaling generator 216) that respectively indicate whether respective information blocks and/or groups of information blocks (e.g., corresponding to SI messages, idle mode or connected mode users, etc.) among the blocks identified at block 1002 are updated in the modification initiated at block 1004. Finally, methodology 1000 can conclude at block 1008, wherein the bitmap generated at block 1006 is transmitted within one or more information blocks and/or a paging message used to signify the modification initiated at block 1004.

Figure 11:
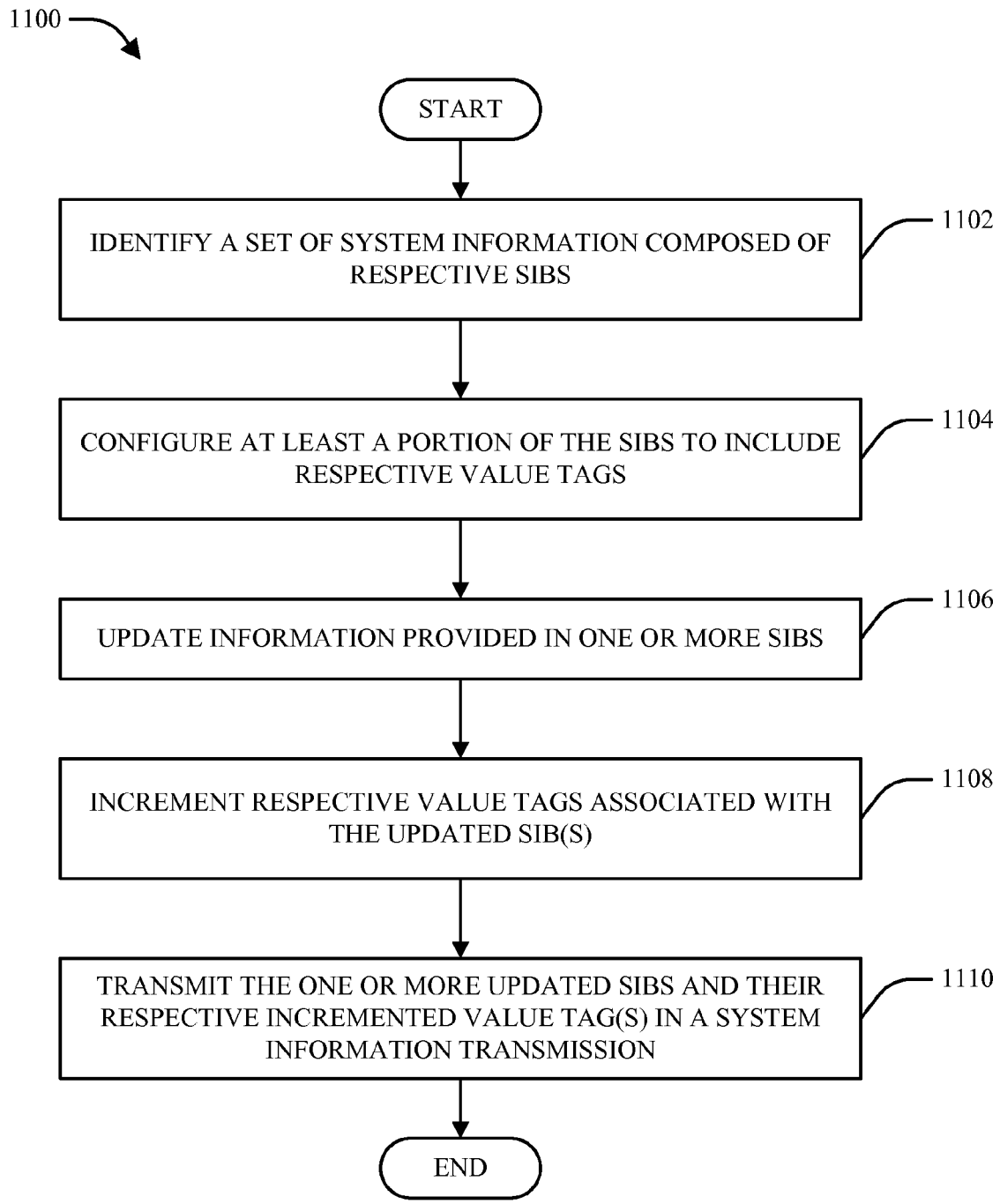

FIG. 11 illustrates a methodology 1100 for managing a system information modification using respective internal value tags (e.g., tags 434). Methodology 1100 can be performed by, for example, a base station and/or any other suitable network device. Methodology 1100 begins at block 1102, wherein a set of system information composed of respective SIBs (e.g., MIB(s) and/or SIB(s) provided as blocks 432) are identified. Next, at block 1104, at least a portion of the SIBs identified at block 1102 are configured (e.g., by block-level value tag generator 414 and/or system information signaling generator 416) to include respective value tags. Methodology 1100 can then proceed to block 1106, wherein information provided in one or more SIBs is updated (e.g., using system modification coordinator 412). In response, at block 1108, respective value tags associated with the SIB(s) updated at block 1106 are incremented. Methodology 1100 can then conclude at block 1110, wherein the SIB(s) updated at block 1106 and their respective value tag(s) as incremented at block 1108 are transmitted in a system information transmission.

Figure 12:
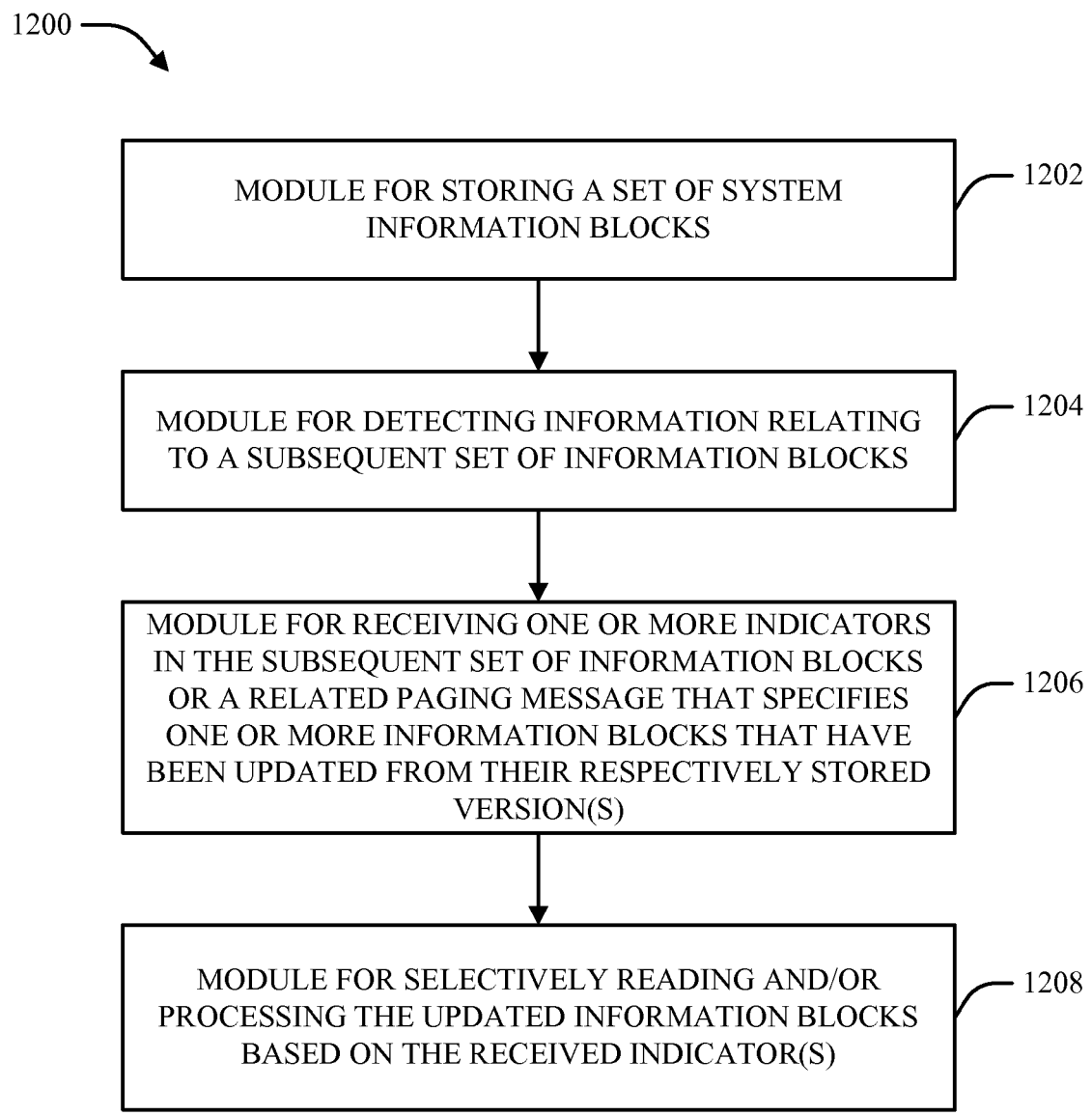
FIGS. 12-13 are block diagrams of respective apparatuses that facilitate coordination and management of updates to information associated with a wireless communication system.

FIG. 12 illustrates an apparatus 1200 that facilitates coordination and management of updates to information associated with a wireless communication system. It is to be appreciated that apparatus 1200 is represented as including functional blocks, which can be functional blocks that represent functions implemented by a processor, software, or combination thereof (e.g., firmware). Apparatus 1200 can be implemented by a wireless terminal (e.g., UE 120) and/or any other suitable network device and can include a module 1202 for storing a set of system information blocks, a module 1204 for detecting information relating to a subsequent set of information blocks, a module 1206 for receiving one or more indicators in the subsequent set of information blocks or a related paging message that specifies one or more information blocks that have been updated from their respectively stored version(s), and a module 1208 for selectively reading and/or processing the updated information blocks based on the received indicator(s).

Figure 13:
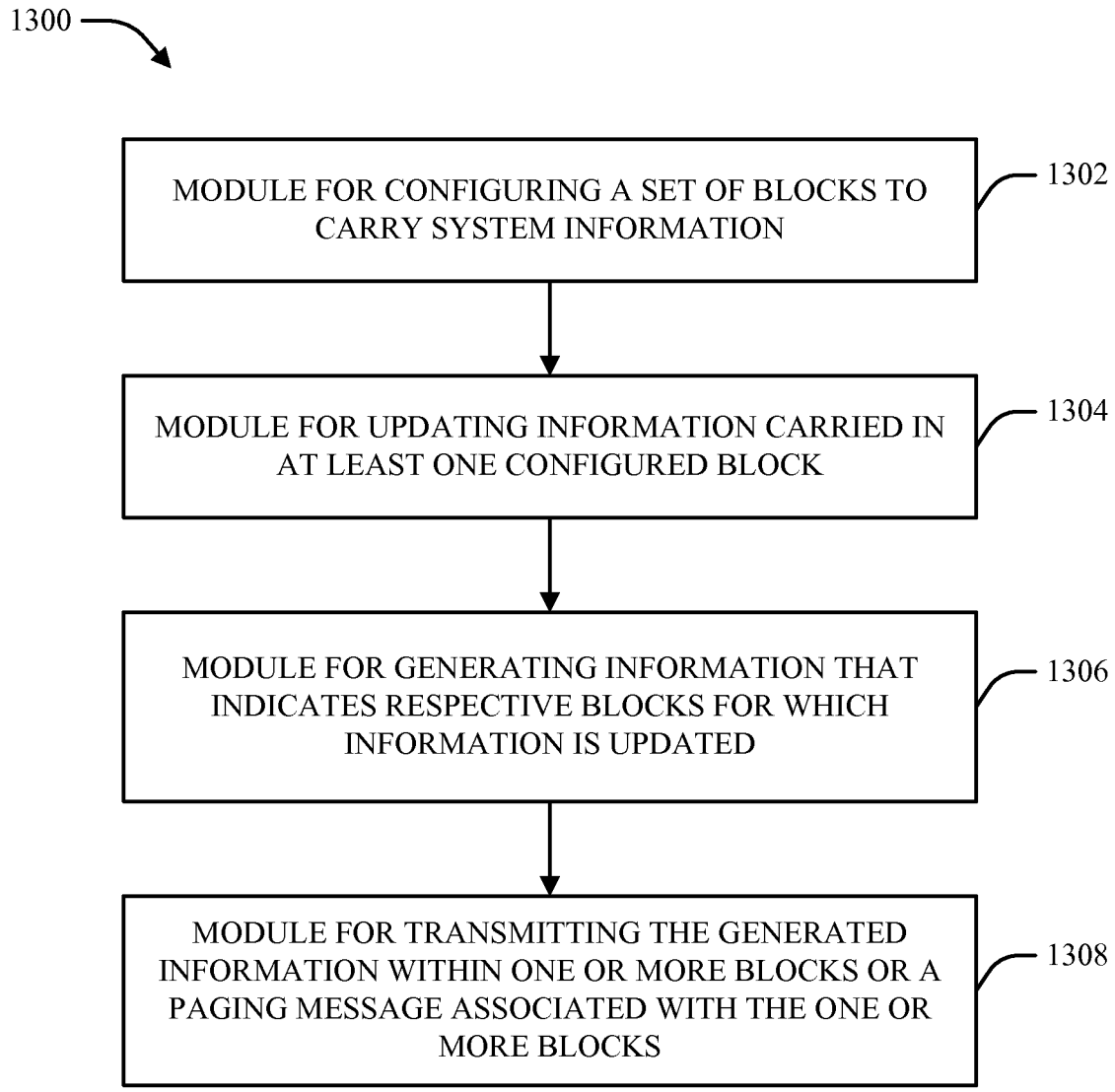

FIG. 13 illustrates another apparatus 1300 that facilitates coordination and management of updates to information associated with a wireless communication system. Apparatus 1300 is represented as including functional blocks, which can be functional blocks that represent functions implemented by a processor, software, or combination thereof (e.g., firmware) . Apparatus 1300 can be implemented by an access point (e.g., Node B 110) and/or any other suitable network device and can include a module 1302 for configuring a set of blocks to carry system information, a module 1304 for updating information carried in at least one configured block, a module 1306 for generating information that indicates respective blocks for which information is updated, and a module 1308 for transmitting the generated information within one or more blocks or a paging message associated with the one or more blocks.

Figure 14:
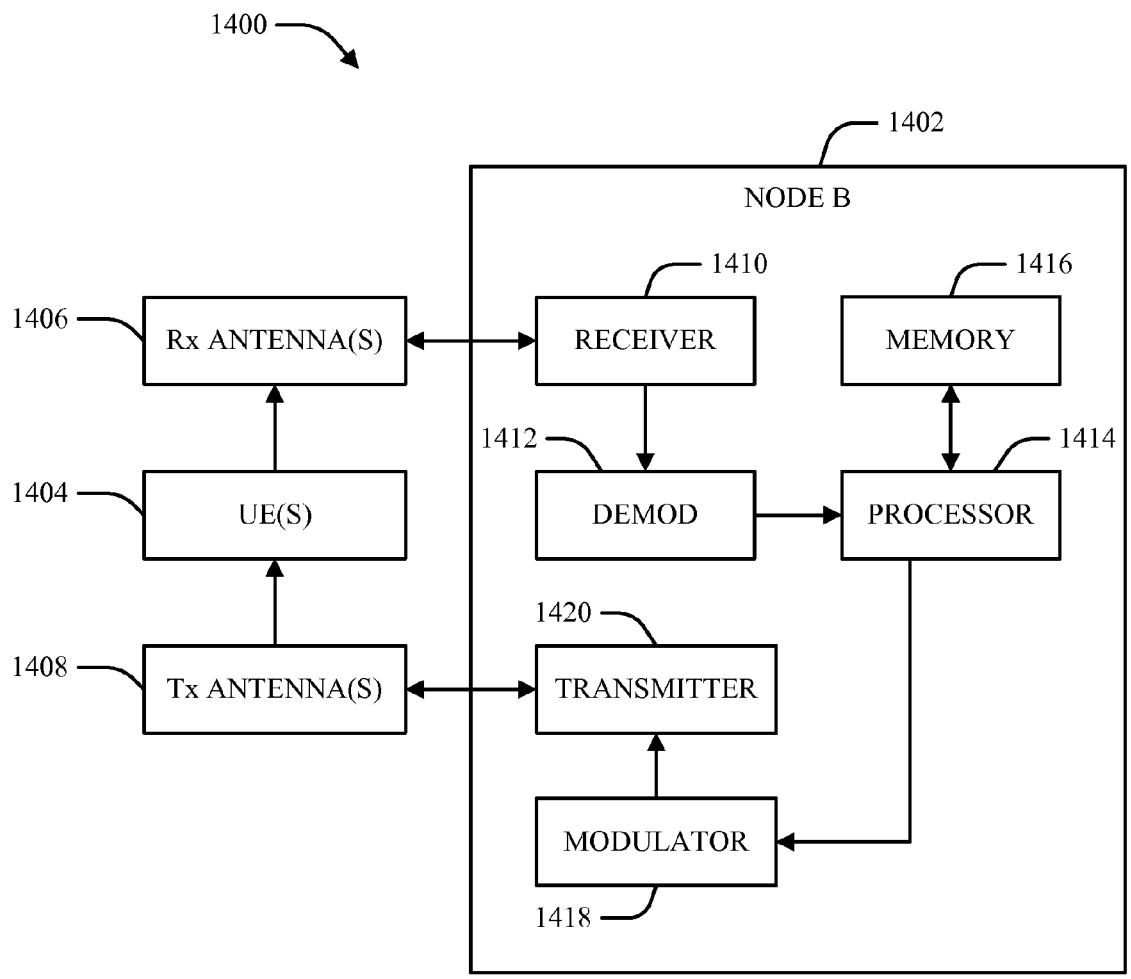
FIGS. 14-15 are block diagrams of respective wireless communication devices that can be utilized to implement various aspects of the functionality described herein.

FIG. 14 is a block diagram of a system 1400 that can be utilized to implement various aspects of the functionality described herein. In one example, system 1400 includes a base station or Node B 1402. As illustrated, Node B 1402 can receive signal(s) from one or more UEs 1404 via one or more receive (Rx) antennas 1406 and transmit to the one or more UEs 1404 via one or more transmit (Tx) antennas 1408. Additionally, Node B 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. Additionally, Node B 1402 can employ processor 1414 to perform methodologies 900-1100 and/or other similar and appropriate methodologies. In one example, Node B 1402 can also include a modulator 1418 that can multiplex a signal for transmission by a transmitter 1420 through transmit antenna(s) 1408.

Figure 15:
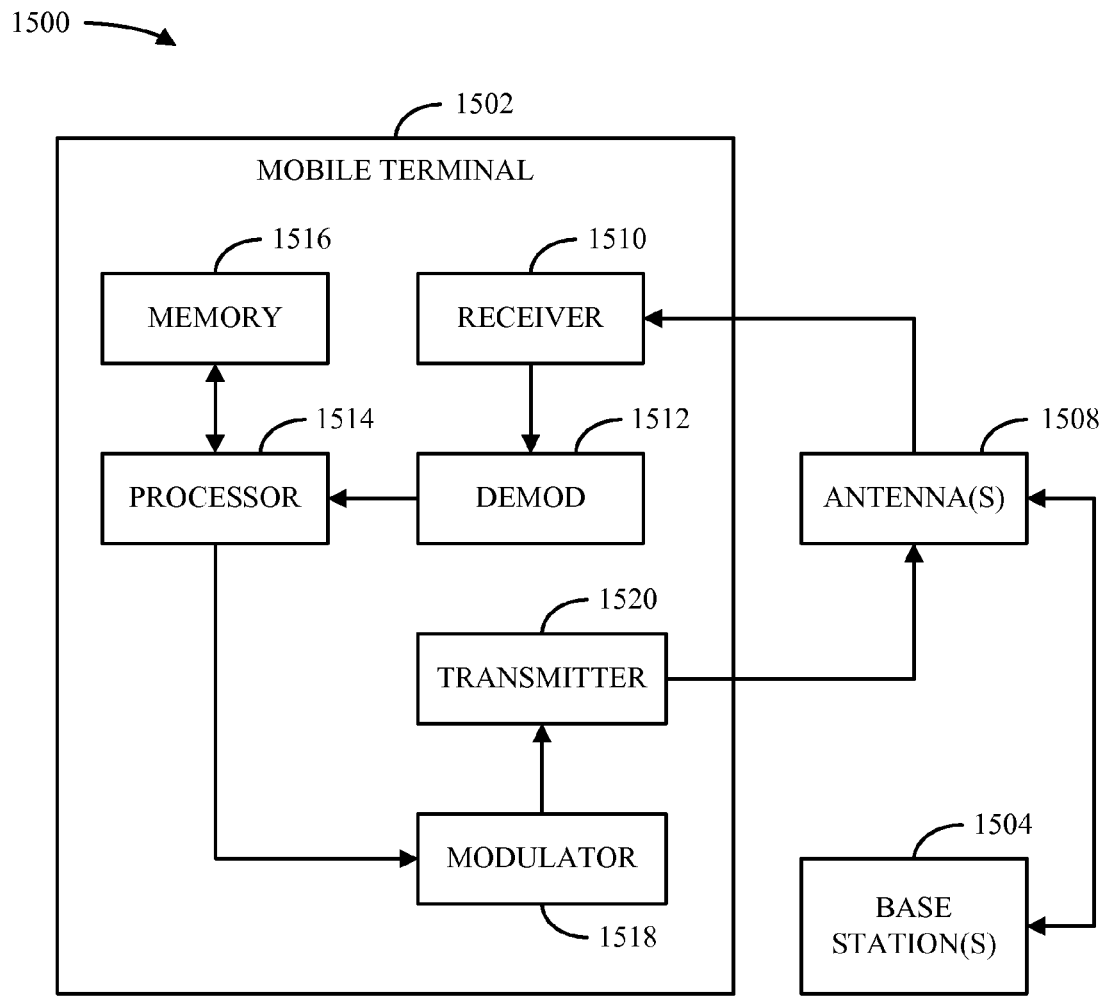

FIG. 15 is a block diagram of another system 1500 that can be utilized to implement various aspects of the functionality described herein. In one example, system 1500 includes a mobile terminal 1502. As illustrated, mobile terminal 1502 can receive signal(s) from one or more base stations 1504 and transmit to the one or more base stations 1504 via one or more antennas 1508. Additionally, mobile terminal 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to mobile terminal 1502. Additionally, mobile terminal 1502 can employ processor 1514 to perform methodologies 600-800 and/or other similar and appropriate methodologies. Mobile terminal 1502 can also include a modulator 1518 that can multiplex a signal for transmission by a transmitter 1520 through antenna(s) 1508.

Figure 16:
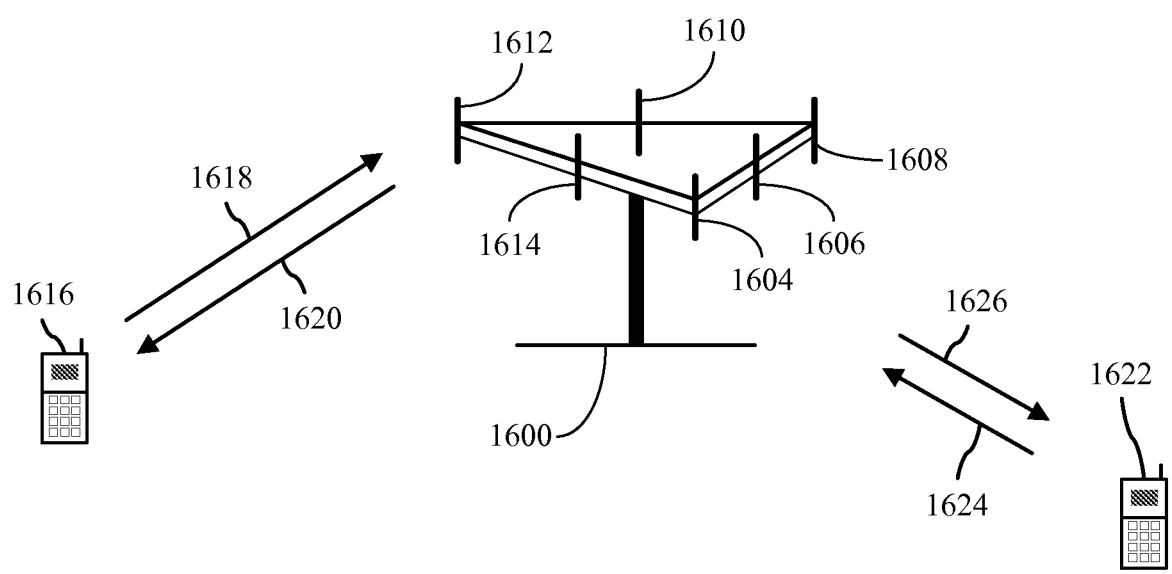
FIG. 16 illustrates a wireless multiple-access communication system in accordance with various aspects set forth herein.

Referring now to FIG. 16, an illustration of a wireless multiple-access communication system is provided in accordance with various aspects. In one example, an access point 1600 (AP) includes multiple antenna groups. As illustrated in FIG. 16, one antenna group can include antennas 1604 and 1606, another can include antennas 1608 and 1610, and another can include antennas 1612 and 1614. While only two antennas are shown in FIG. 16 for each antenna group, it should be appreciated that more or fewer antennas may be utilized for each antenna group. In another example, an access terminal 1616 can be in communication with antennas 1612 and 1614, where antennas 1612 and 1614 transmit information to access terminal 1616 over forward link 1620 and receive information from access terminal 1616 over reverse link 1618. Additionally and/or alternatively, access terminal 1622 can be in communication with antennas 1606 and 1608, where antennas 1606 and 1608 transmit information to access terminal 1622 over forward link 1626 and receive information from access terminal 1622 over reverse link 1624. In a frequency division duplex system, communication links 1618, 1620, 1624 and 1626 can use different frequency for communication. For example, forward link 1620 may use a different frequency then that used by reverse link 1618.

Each group of antennas and/or the area in which they are designed to communicate can be referred to as a sector of the access point. In accordance with one aspect, antenna groups can be designed to communicate to access terminals in a sector of areas covered by access point 1600. In communication over forward links 1620 and 1626, the transmitting antennas of access point 1600 can utilize beamforming in order to improve the signal-to-noise ratio of forward links for the different access terminals 1616 and 1622. Also, an access point using beamforming to transmit to access terminals scattered randomly through its coverage causes less interference to access terminals in neighboring cells than an access point transmitting through a single antenna to all its access terminals.

An access point, e.g., access point 1600, can be a fixed station used for communicating with terminals and can also be referred to as a base station, an eNB, an access network, and/or other suitable terminology. In addition, an access terminal, e.g., an access terminal 1616 or 1622, can also be referred to as a mobile terminal, user equipment, a wireless communication device, a terminal, a wireless terminal, and/or other appropriate terminology.

Figure 17:
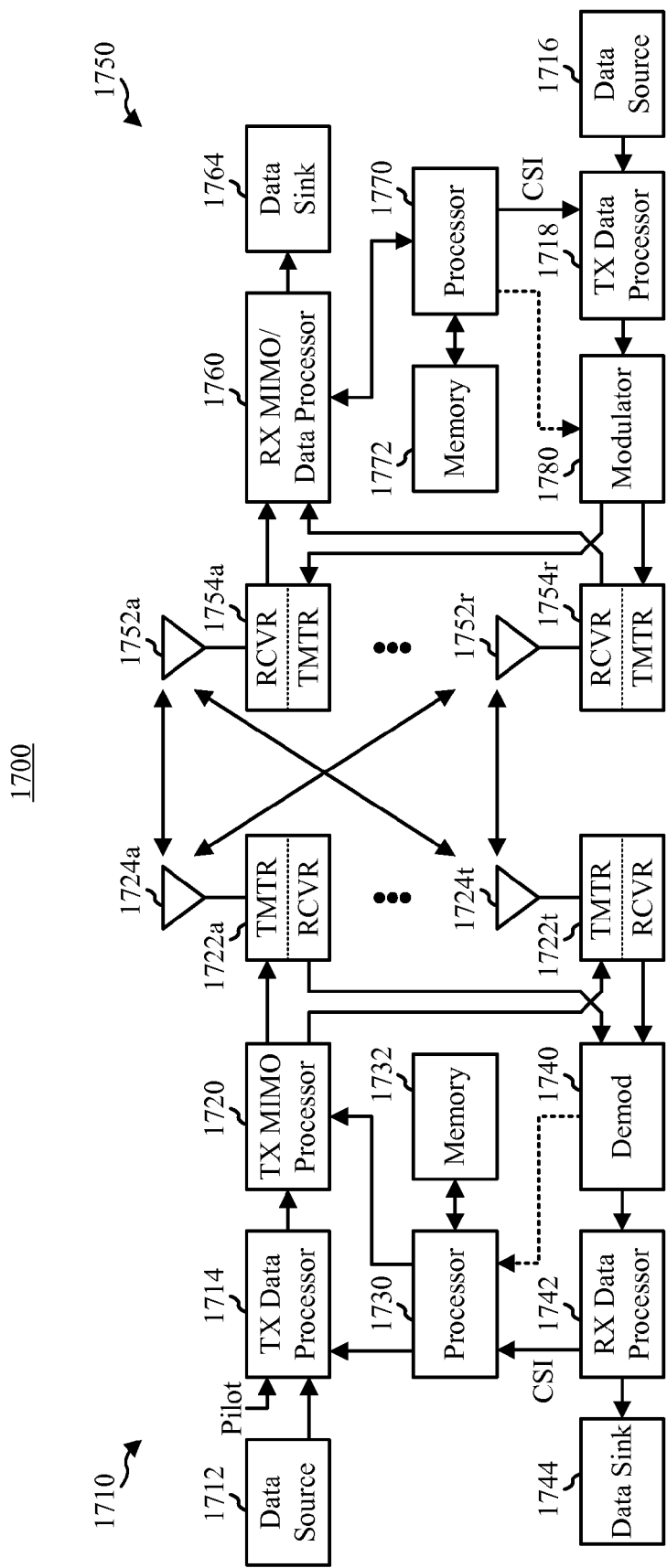
FIG. 17 is a block diagram illustrating an example wireless communication system in which various aspects described herein can function.

Referring now to FIG. 17, a block diagram illustrating an example wireless communication system 1700 in which various aspects described herein can function is provided. In one example, system 1700 is a multiple-input multiple-output (MIMO) system that includes a transmitter system 1710 and a receiver system 1750. It should be appreciated, however, that transmitter system 1710 and/or receiver system 1750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1710 and/or receiver system 1750 described herein could be utilized in connection with a single output to single input antenna system.

In accordance with one aspect, traffic data for a number of data streams are provided at transmitter system 1710 from a data source 1712 to a transmit (TX) data processor 1714. In one example, each data stream can then be transmitted via a respective transmit antenna 1724. Additionally, TX data processor 1714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1750 to estimate channel response. Back at transmitter system 1710, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1730.

Next, modulation symbols for all data streams can be provided to a TX processor 1720, which can further process the modulation symbols (e.g., for OFDM). TX MIMO processor 1720 can then provides $N_T$ modulation symbol streams to $N_T$ transceivers 1722a through 1722t. In one example, each transceiver 1722 can receive and process a respective symbol stream to provide one or more analog signals. Each transceiver 1722 can then further condition (e.g., amplify, filter, and upconvert) the analog signals to provide a modulated signal suitable for transmission over a MIMO channel. Accordingly, $N_T$ modulated signals from transceivers 1722a through 1722t can then be transmitted from $N_T$ antennas 1724a through 1724t, respectively.

In accordance with another aspect, the transmitted modulated signals can be received at receiver system 1750 by $N_R$ antennas 1752a through 1752r. The received signal from each antenna 1752 can then be provided to respective transceivers 1754. In one example, each transceiver 1754 can condition (e.g., filter, amplify, and downconvert) a respective received signal, digitize the conditioned signal to provide samples, and then processes the samples to provide a corresponding "received" symbol stream. An RX MIMO/data processor 1760 can then receive and process the $N_R$ received symbol streams from $N_R$ transceivers 1754 based on a particular receiver processing technique to provide $N_T$ "detected" symbol streams. In one example, each detected symbol stream can include symbols that are estimates of the modulation symbols transmitted for the corresponding data stream. RX processor 1760 can then process each symbol stream at least in part by demodulating, deinterleaving, and decoding each detected symbol stream to recover traffic data for a corresponding data stream. Thus, the processing by RX processor 1760 can be complementary to that performed by TX MIMO processor 1720 and TX data processor 1716 at transmitter system 1710. RX processor 1760 can additionally provide processed symbol streams to a data sink 1764.

In accordance with one aspect, the channel response estimate generated by RX processor 1760 can be used to perform space/time processing at the receiver, adjust power levels, change modulation rates or schemes, and/or other appropriate actions. Additionally, RX processor 1760 can further estimate channel characteristics such as, for example, signal-to-noise-and-interference ratios (SNRs) of the detected symbol streams. RX processor 1760 can then provide estimated channel characteristics to a processor 1770. In one example, RX processor 1760 and/or processor 1770 can further derive an estimate of the "operating" SNR for the system. Processor 1770 can then provide channel state information (CSI), which can comprise information regarding the communication link and/or the received data stream. This information can include, for example, the operating SNR. The CSI can then be processed by a TX data processor 1718, modulated by a modulator 1780, conditioned by transceivers 1754a through 1754r, and transmitted back to transmitter system 1710. In addition, a data source 1716 at receiver system 1750 can provide additional data to be processed by TX data processor 1718.

Back at transmitter system 1710, the modulated signals from receiver system 1750 can then be received by antennas 1724, conditioned by transceivers 1722, demodulated by a demodulator 1740, and processed by a RX data processor 1742 to recover the CSI reported by receiver system 1750. In one example, the reported CSI can then be provided to processor 1730 and used to determine data rates as well as coding and modulation schemes to be used for one or more data streams. The determined coding and modulation schemes can then be provided to transceivers 1722 for quantization and/or use in later transmissions to receiver system 1750. Additionally and/or alternatively, the reported CSI can be used by processor 1730 to generate various controls for TX data processor 1714 and TX MIMO processor 1720. In another example, CSI and/or other information processed by RX data processor 1742 can be provided to a data sink 1744.

In one example, processor 1730 at transmitter system 1710 and processor 1770 at receiver system 1750 direct operation at their respective systems. Additionally, memory 1732 at transmitter system 1710 and memory 1772 at receiver system 1750 can provide storage for program codes and data used by processors 1730 and 1770, respectively. Further, at receiver system 1750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying a set of system information associated with a wireless communication environment, the system information comprising one or more blocks;
    receiving respective indicators relating to a modification of the system information within one or more of a block of the system information, wherein the indicators comprise internal value tags, the internal value tags being located within respective blocks and configured to indicate whether the respective blocks have changed in the modification of the system information; and
    performing at least one of reading or processing respective blocks in a selective manner such that the reading or processing is omitted for at least one block identified as unchanged in the modification, wherein the performing at least one of reading or processing comprises storing respective blocks indicated by a corresponding internal value tag as changed in the modification and discarding respective blocks indicated by a corresponding internal value tag as unchanged in the modification.

2. The method of claim 1, wherein:
    the receiving further comprises receiving internal value tags within less than all blocks in the system information; and
    the performing at least one of reading or processing comprises storing respective blocks for which internal value tags are not received.

3. A wireless communications apparatus, comprising:
    a memory that stores data relating to system information corresponding to an associated wireless communication network, the system information comprising one or more blocks; and
    a processor configured to:
        identify modification information within one or more blocks, the modification information comprising internal value tags located within respective blocks, the internal value tags configured to indicate whether the respective blocks have been updated; and
        selectively read or process respective blocks such that no reading or processing is performed for at least one block not identified as updated by the modification information, wherein the processor is further configured to store respective blocks indicated by a corresponding internal value tag as updated and to discard respective blocks not indicated by a corresponding internal value tag as updated.

4. The wireless communications apparatus of claim 3, wherein the processor is further configured to identify internal value tags in fewer than all of the one or more blocks and to store respective blocks for which an internal value tag is not identified.

5. An apparatus operable in a wireless communication system, the apparatus comprising:
    means for storing a set of system information blocks;
    means for detecting information relating to a subsequent set of information blocks; and
    means for receiving one or more indicators in the subsequent set of information blocks, wherein the one or more indicators include value tags located within respective information blocks in the subsequent set of information blocks, the internal value tags configured to indicate whether the respective information blocks in which the value tags are provided have been updated; and
    means for selectively receiving or processing at least one updated information block based on the received indicators, wherein the means for selectively receiving or processing comprises means for storing respective information blocks indicated by a corresponding value tag as updated and means for discarding respective information blocks not indicated by a corresponding value tag as updated.

6. The apparatus of claim 5, wherein:
    the means for receiving further comprises receiving value tags within less than all information blocks in the subsequent set of information blocks; and
    the means for selectively receiving or processing comprises means for storing respective information blocks for which value tags are not received.

7. A computer program product, comprising:
    a computer-readable medium, comprising:
        code for causing a computer to identify system information associated with a serving wireless communication network, the system information comprising one or more information blocks;
        code for causing a computer to detect information relating to one or more subsequent information blocks;
        code for causing a computer to receive respective indicators in one or more subsequent information blocks, the respective indicators including internal value tags located within respective subsequent information blocks, the internal value tags configured to indicate whether the respective subsequent information blocks in which the value tags are provided have been updated in the system information modification; and code for causing a computer to read or process subsequent information blocks in a selective manner such that no reading or processing is performed for at least one subsequent information block not identified as updated by the respective received indicators, wherein the code for causing a computer to read or process subsequent information blocks comprises code for causing a computer to process respective subsequent information blocks indicated by a corresponding value tag as updated and code for causing a computer to discard respective subsequent information blocks not indicated by a corresponding value tag as updated.

8. A method, comprising:
identifying a set of system information associated with a wireless communication environment, the system information comprising a first group of blocks that affect respective users in the idle mode or the connected mode and a second group of blocks that affect respective users in the idle mode;
receiving respective indicators relating to a modification of the system information in one or more of a block of the system information, wherein the indicators include a bitmap comprising one or more bits respectively configured to indicate whether corresponding blocks or groups of blocks in the system information have changed in the modification of the system information, and wherein the bitmap comprises at least a first bit that indicates whether any of the blocks in the first group of blocks have been changed in the modification; and
performing at least one of reading or processing respective blocks in a selective manner such that the reading or processing is omitted for at least one block identified as unchanged in the modification, wherein the performing at least one of reading or processing comprises reading respective blocks or groups of blocks indicated by the bitmap as changed in the modification and abstaining from reading respective blocks or groups of blocks indicated by the bitmap as unchanged in the modification.

9. The method of claim 8, wherein respective bits in the bitmap are set to a first value to indicate changed information or to a second value to indicate unchanged information.

10. The method of claim 8, wherein:
the one or more blocks comprise a master information block followed by one or more system information blocks; and
the receiving further comprises receiving the bitmap within the master information block or a first system information block following the master information block.

11. The method of claim 8, wherein:
the system information comprises one or more system information messages composed of respective sets of blocks; and
the receiving further comprises receiving a bitmap comprising one or more bits configured to indicate changes to respective system information messages or the respective sets of blocks corresponding to the respective system information messages.

12. The method of claim 8, further comprising selecting an operating mode including one of an idle mode and a connected mode, wherein the performing at least one of reading or processing comprises, upon selecting the connected mode, reading respective blocks in the first group of blocks upon determining that the bitmap indicates a change to one or more blocks in the first group of blocks and abstaining from reading the second group of blocks.

13. The method of claim 12, wherein:
the bitmap further comprises at least a second bit that indicates whether one or more blocks in the second group of blocks have been changed in the modification; and
the performing at least one of reading or processing comprises, upon selecting the idle mode, reading respective blocks in the first group of blocks upon determining that the bitmap indicates a change to one or more blocks in the first group of blocks and reading respective blocks in the second group of blocks upon determining that the bitmap indicates a change to one or more blocks in the second group of blocks.

14. The method of claim 8, wherein the receiving further comprises receiving the bitmap in a paging message over a paging control channel.

15. A wireless communications apparatus, comprising:
a memory configured to store data relating to system information corresponding to an associated wireless communication network, the system information comprising one or more blocks, wherein the memory further stores data relating to a first subset of the one or more blocks that affects the wireless communications apparatus while in an idle mode or a connected mode and a second subset of the one or more blocks that affects the wireless communications apparatus while in an idle mode; and
a processor configured to:
identify modification information in one or more blocks, wherein the modification information comprises a bitmap comprising one or more bits respectively configured to indicate whether corresponding blocks or groups of blocks have been updated, and wherein the bitmap comprises at least a first bit configured to indicate whether any of the blocks in the first subset of blocks have been updated and at least a second bit configured to indicate whether one or more blocks in the second subset of blocks have been updated; and
selectively read or process respective blocks such that no reading or processing is performed for at least one block not identified as updated by the modification information, wherein the processor is further configured to read respective blocks or groups of blocks indicated by the bitmap as updated and to omit reading of respective blocks or groups of blocks not indicated by bitmap as updated.

16. The wireless communications apparatus of claim 15, wherein respective bits in the bitmap are set to a first value to indicate updated information or to a second value to indicate non-updated information.

17. The wireless communications apparatus of claim 15, wherein:
the one or more blocks comprise a master information block followed by one or more system information blocks; and
the processor is further configured to receive the bitmap within the master information block or a first system information block following the master information block.

18. The wireless communications apparatus of claim 15, wherein:
the memory further stores data relating to one or more system information messages composed of respective subsets of the one or more blocks; and
the bitmap comprises one or more bits respectively configured to indicate whether respective system information messages or sets of blocks corresponding to the respective system information messages have been updated.

19. An apparatus operable in a wireless communication system, the apparatus comprising:
- means for storing a set of system information blocks including a first group of blocks that affect respective users in the idle mode or the connected mode and a second group of blocks that affect respective users in the idle mode;
- means for detecting information relating to a subsequent set of information blocks; and
- means for receiving one or more indicators in the subsequent set of information blocks provided in the detected information, wherein the one or more indicators includes a bitmap comprising one or more bits respectively configured to indicate whether corresponding information blocks or groups of information blocks have been updated in the modification, and wherein the bitmap comprises at least a first bit that indicates whether any of the blocks in the first group of blocks have been updated in the modification; and
- means for selectively receiving or processing at least one updated information block based on the received indicators, wherein the means for selectively receiving or processing comprises means for receiving at least one information block or group of information blocks indicated by the bitmap as updated and means for electing not to receive at least one information block or group of information blocks not indicated by the bitmap as updated.

20. The apparatus of claim 19, wherein:
- the set of system information blocks comprises a master information block followed by one or more system information blocks; and
- the means for receiving further comprises means for receiving the bitmap within the master information block or a first system information block following the master information block.

21. The apparatus of claim 19, wherein the means for receiving further comprises means for receiving the bitmap in a paging message using a paging control channel.

22. The method of claim 19, further comprising:
- means for selecting an operating mode including one of an idle mode and a connected mode; and
- means for, upon selecting the connected mode, reading respective blocks in the first group of blocks upon determining that the bitmap indicates an update to one or more blocks in the first group of blocks and abstaining from reading the second group of blocks.

23. The method of claim 22, further comprising:
- wherein the bitmap further comprises at least a second bit that indicates whether one or more blocks in the second group of blocks have been updated in the modification; and
- means for, upon selecting the idle mode, reading respective blocks in the first group of blocks upon determining that the bitmap indicates an update to one or more blocks in the first group of blocks and reading respective blocks in the second group of blocks upon determining that the bitmap indicates an update to one or more blocks in the second group of blocks.

24. A computer program product, comprising:
a computer-readable medium, comprising:
- code for causing a computer to identify system information associated with a serving wireless communication network, the system information comprising one or more information blocks including a first group of blocks that affect respective users in the idle mode or the connected mode and a second group of blocks that affect respective users in the idle mode;
- code for causing the computer to detect information relating to one or more subsequent information blocks;
- code for causing the computer to receive respective indicators in one or more subsequent information blocks, wherein the respective indicators include a bitmap comprising one or more bits respectively configured to indicate whether corresponding subsequent information blocks or groups of subsequent information blocks have been updated in the system information modification that identify respective information blocks that have been updated in a system information modification, and wherein the bitmap comprises at least a first bit that indicates whether any of the blocks in the first group of blocks have been updated in the system information modification; and
- code for causing the computer to read or process subsequent information blocks in a selective manner such that no reading or processing is performed for at least one subsequent information block not identified as updated by the respective received indicators, wherein the code for causing the computer to read or process subsequent information blocks comprises code for causing a computer to receive respective subsequent information blocks or groups of subsequent information blocks indicated by the bitmap as updated in the system information modification and code for causing a computer to elect not to receive respective subsequent information blocks or groups of subsequent information blocks indicated by the bitmap as not updated in the system information modification.

25. The computer program product of claim 24, further comprising:
- code for causing the computer to select an operating mode including one of an idle mode and a connected mode; and
- code for causing the computer to, upon selecting the connected mode, read respective blocks in the first group of blocks upon determining that the bitmap indicates an update to one or more blocks in the first group of blocks and abstaining from reading the second group of blocks.

26. The computer program product of claim 25, wherein:
- the bitmap further comprises at least a second bit that indicates whether one or more blocks in the second group of blocks have been updated in the modification; and
- the code for causing the computer to read comprises code for causing the computer to, upon selecting the idle mode, read respective blocks in the first group of blocks upon determining that the bitmap indicates an update to one or more blocks in the first group of blocks and reading respective blocks in the second group of blocks upon determining that the bitmap indicates an update to one or more blocks in the second group of blocks.

* * * * *